United States Patent
Jeon et al.

(10) Patent No.: US 12,190,229 B2
(45) Date of Patent: Jan. 7, 2025

(54) STREAMING ACCELERATORS AND STREAMING SYSTEMS INCLUDING THE SAME

(71) Applicant: SAMSUNG ELECTRONICS CO., LTD., Suwon-si (KR)

(72) Inventors: Hyoungjun Jeon, Seongnam-si (KR);
Sangsoo Ko, Yongin-si (KR);
Kyoungyoung Kim, Suwon-si (KR);
Byeoungsu Kim, Hwaseong-si (KR);
Sanghyuck Ha, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 844 days.

(21) Appl. No.: 17/341,650

(22) Filed: Jun. 8, 2021

(65) Prior Publication Data
US 2022/0156566 A1 May 19, 2022

(30) Foreign Application Priority Data
Nov. 18, 2020 (KR) .................. 10-2020-0154598

(51) Int. Cl.
*G06N 3/063* (2023.01)
*G06N 3/045* (2023.01)
(Continued)

(52) U.S. Cl.
CPC ............. *G06N 3/063* (2013.01); *G06N 3/045* (2023.01); *G06T 1/20* (2013.01); *H04L 65/75* (2022.05)

(58) Field of Classification Search
CPC .......... G06N 3/063; G06N 3/045; G06T 1/20; H04L 65/75; H04L 65/612; H04L 65/762; H04L 65/611; H04L 65/764; H04N 21/2343; H04N 21/2381; G06F 9/28; G06F 9/30079; G06F 9/3867
See application file for complete search history.

(56) References Cited

U.S. PATENT DOCUMENTS 8,250,578 B2   8/2012  Krishnamurthy et al.
9,396,113 B2 *  7/2016  Gove .................. G06F 12/0804
(Continued)

FOREIGN PATENT DOCUMENTS

KR    10 2018 0099891 A    9/2018
KR    10 2019 0074195 A    6/2019
WO    WO 01/067271 A1     9/2001

*Primary Examiner* — Farley Abad
(74) *Attorney, Agent, or Firm* — FINNEGAN, HENDERSON, FARABOW, GARRETT & DUNNER LLP

(57) ABSTRACT

A streaming accelerator includes a first pool, a first switch bus, a second pool and a second switch bus. The first pool includes neural processing unit (NPU) bundles, and each of NPU bundles includes a plurality of NPUs. The first switch bus provides a first streaming data to a first selected NPU bundle and a second selected NPU bundle respectively. The second pool includes network interface card (NIC) bundles, and each of the NIC bundles includes an encoder and a NIC. The second switch bus provides a first intermediate streaming data and a second intermediate streaming data to a first selected NIC bundle and a second selected NIC bundle. The first selected NIC bundle encodes the first intermediate streaming data to generate a first encoded streaming data. The second selected NIC bundle encodes the second intermediate streaming data to generate a second encoded streaming data.

20 Claims, 19 Drawing Sheets

(51) Int. Cl.
    *G06T 1/20*         (2006.01)
    *H04L 65/75*      (2022.01)

(56) References Cited

U.S. PATENT DOCUMENTS

| | | |
|---|---|---|
| 10,003,811 B2 | 6/2018 | Sadhwani et al. |
| 10,339,041 B2 | 7/2019 | Rangan et al. |
| 10,606,779 B2 | 3/2020 | Custodio |
| 10,715,451 B2 | 7/2020 | Raindel et al. |
| 10,726,328 B2 | 7/2020 | Ling et al. |
| 11,120,526 B1* | 9/2021 | Demyanov ............... G06T 5/00 |
| 2017/0286401 A1* | 10/2017 | He .......................... G06F 17/16 |
| 2020/0097720 A1* | 3/2020 | Yang ...................... G06N 3/045 |
| 2020/0104690 A1* | 4/2020 | Bai .................... G06F 9/30098 |
| 2020/0342297 A1* | 10/2020 | Dai ....................... G06F 9/5066 |
| 2021/0073618 A1* | 3/2021 | Boussarov ............. G06N 3/045 |

\* cited by examiner

FIG. 16

| USER | NPU BUNDLES | NIC BUNDLES | NIC(MODELS) |
|---|---|---|---|
| USER#1 | ID_00 | ID_10 | ID_33 |
| USRE#2 | ID_02 | ID_11 | ID_33 |

STREAMING ACCELERATORS AND STREAMING SYSTEMS INCLUDING THE SAME

CROSS-REFERENCE TO RELATED APPLICATION

Korean Patent Application No. 10-2020-0154598, filed on Nov. 18, 2020 in the Korean Intellectual Property Office, and entitled: "Streaming Accelerators and Streaming Systems Including the Same," is incorporated by reference herein in its entirety.

BACKGROUND

1. Field

Example embodiments relate generally to providing streaming data, and more particularly to streaming accelerators and streaming systems including the streaming accelerators.

2. Description of the Related Art

An interactive streaming service such as game streaming is one of next-generation fields that have recently emerged. Recently, high-specification games have been introduced and game streaming services have become important because a client device may not run the high-specification games. In a game streaming service, it is important to provide high-resolution frames to users rapidly.

SUMMARY

Embodiments are directed to a streaming accelerator, including: a first pool including a plurality of neural processing unit (NPU) bundles, each of the plurality of NPU bundles including a plurality of NPUs; a first switch bus, the first switch bus being configured to, in response to a first bus control signal, provide a first streaming data and a second streaming data to a first selected NPU bundle and a second selected NPU bundle from among the plurality of NPU bundles, respectively, the first streaming data corresponding to a first user and the second streaming data corresponding to a second user; a second pool including a plurality of network interface card (NIC) bundles, each of the plurality of NIC bundles including an encoder and a NIC; and a second switch bus, connected between the first pool and the second pool, the second switch bus being configured to, in response to a second bus control signal, provide a first intermediate streaming data from the first selected NPU bundle and a second intermediate streaming data from the second selected NPU bundle to a first selected NIC bundle and a second selected NIC bundle from among the plurality of NIC bundles, respectively. The first selected NIC bundle may be configured to encode the first intermediate streaming data to generate a first encoded streaming data, and configured to provide the first encoded streaming data to a first client device associated with the first user. The second selected NIC bundle may be configured to encode the second intermediate streaming data to generate a second encoded streaming data, and configured to provide the second encoded streaming data to a second client device associated with the second user.

Embodiments are also directed to a streaming system, including: a streaming server configured to: encode a first streaming data and a second streaming data in pipelined fashion by applying the first streaming data and the second streaming data to different neural network models among a plurality of neural network models through separate paths, and transmit a first encoded streaming data and a second encoded streaming data; a first client device configured to: receive a first neural network model associated with the first streaming data from among the neural network models, and receive the first encoded streaming data, and decode the first encoded streaming data based on the first neural network model to provide a first recovered streaming data to a first user; and a second client device configured to: receive a second neural network model associated with the second streaming data from among the neural network models, and receive the second encoded streaming data, and decode the second encoded streaming data based on the second neural network model to provide a second recovered streaming data to a second user.

Embodiments are also directed to a streaming accelerator, including: a pool including a plurality of neural processing unit (NPU) bundles and a plurality of network interface card (NIC) bundles corresponding to the plurality of NPU bundles, each of the plurality of NPU bundles including a plurality of NPUs, each of the NIC bundles including an encoder and a NIC; and a switch bus configured to, in response to a bus control signal, provide a first streaming data and a second streaming data to a first selected NPU bundle and a second selected NPU bundle from among the plurality of NPU bundles, respectively, the first streaming data corresponding to a first user and the second streaming data corresponding to a second user. A first NIC bundle, connected to the first selected NPU bundle, from among the plurality of NPU bundles, may be configured to receive a first intermediate streaming data from the first selected NPU bundle. A second NIC bundle, connected to the second selected NPU bundle, from among the plurality of NPU bundles, may be configured to receive a second intermediate streaming data from the second selected NPU bundle. The first NIC bundle may be configured to generate a first encoded streaming data by encoding the first intermediate streaming data to provide the first encoded streaming data to a first client device associated with the first user. The second NIC bundle may be configured to generate a second encoded streaming data by encoding the second intermediate streaming data to provide the second encoded streaming data to a second client device associated with the second user.

BRIEF DESCRIPTION OF THE DRAWINGS

Features will become apparent to those of skill in the art by describing in detail exemplary embodiments with reference to the attached drawings in which:

FIG. 16 illustrates an example embodiment of the scheduler in FIG. 7A assigning NPU bundles and NIC bundles to users.

DETAILED DESCRIPTION

Figure 1:
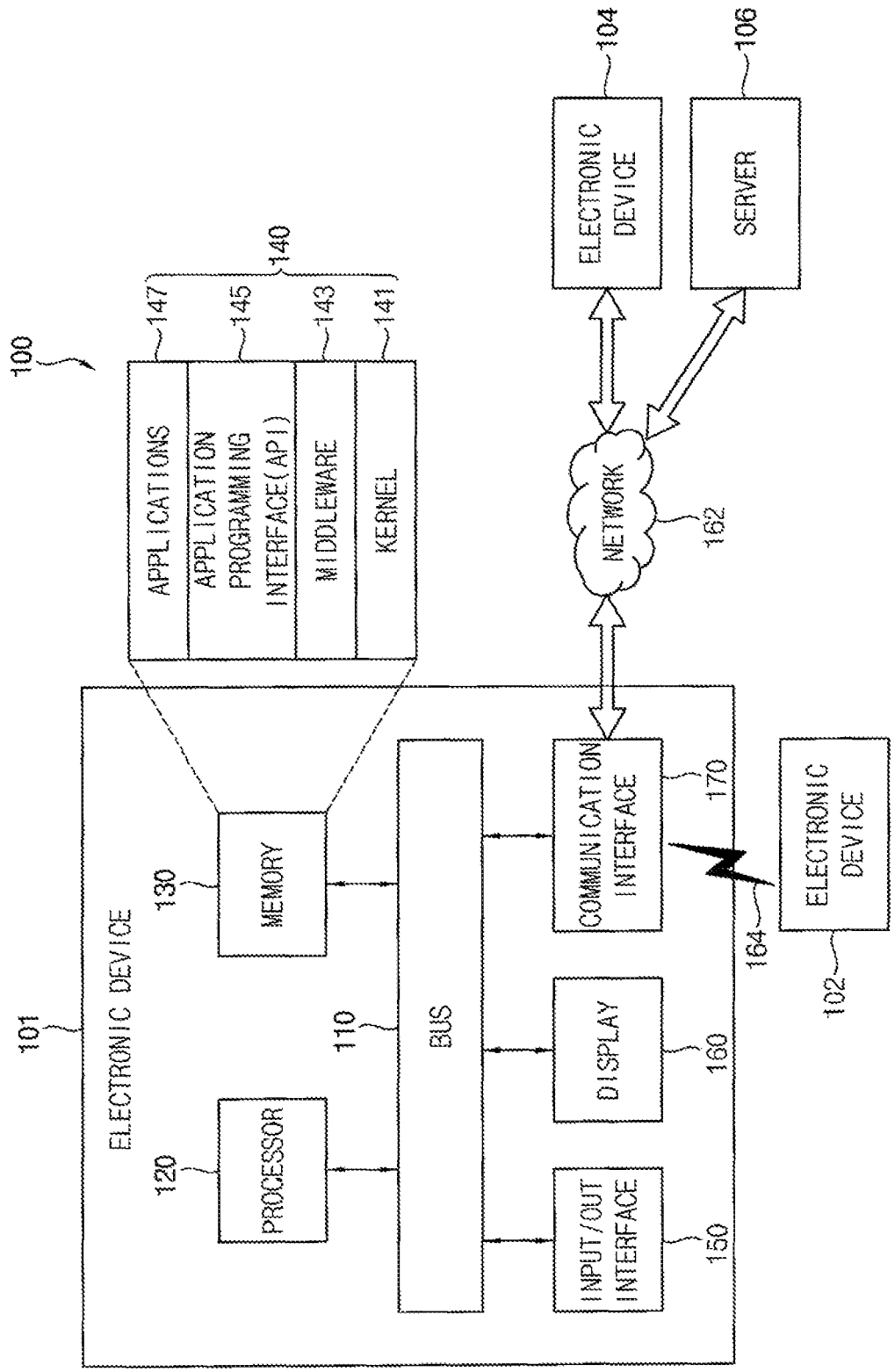
FIG. 1 illustrates an electronic device in a network environment according to example embodiments.

FIG. 1 illustrates an electronic device in a network environment according to example embodiments.

Referring to FIG. 1, an electronic device 101 may operate in a network environment 100.

The electronic device 101 may include a bus 110, a processor 120, a memory 130, an input/output (I/O) interface 150, a display 160, and a communication interface 170. In some example embodiments, the electronic device 101 may omit at least one of the foregoing elements or may further include other elements. The bus 110 may include a circuit for connecting, e.g., the elements 120 to 170 and delivering communication (e.g., a control message or data) between the elements 120 to 170. The processor 120 may include one or more of a central processing unit (CPU), an application processor (AP), and a communication processor (CP). The processor 120 may perform operations or data processing for control and/or communication of, e.g., at least one other element of the electronic device 101.

The processor 120 and/or any portions thereof (e.g., processing units), as well as other computer devices (e.g., servers, and streaming cards), may be implemented by one or more instances of processing circuitry such as hardware including logic circuits; a hardware/software combination such as a processor executing software as described in the above embodiment; or a combination thereof.

The memory 130 may include a volatile and/or nonvolatile memory. The memory 130 may store, e.g., instructions or data associated with at least one other element of the electronic device 101. In some example embodiments, the memory 130 may store software and/or a program 140. The program 140 may include at least one of, e.g., a kernel 141, middleware 143, an application programming interface (API) 145, and/or an application program 147 (or "application"), and the like. At least some of the kernel 141, the middleware 143, and the API 145 may be referred to as an operating system (OS). The kernel 141 may control or manage, e.g., system resources (e.g., the bus 110, the processor 120, the memory 130, etc.) used to execute operations or functions implemented in other programs (e.g., the middleware 143, the API 145, or the application program 147).

The kernel 141 may provide an interface through which the middleware 143, the API 145, and/or the application program 147 accesses separate components of the electronic device 101 to control or manage the system resources.

The middleware 143 may work as an intermediary for allowing, e.g., the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests.

The API 145 may be implemented as an interface used for the application program 147 to control a function provided by the kernel 141 or the middleware 143, and may include, e.g., at least one interface or function (e.g., an instruction) for file control, window control, image processing or character control. The I/O interface 150 may deliver, e.g., an instruction or data input from a user or another external device to other component(s) of the electronic device 101, or output an instruction or data received from other component(s) of the electronic device 101 to a user or another external device.

The display 160 may include, e.g., a liquid crystal display (LCD), a light emitting diode (LED) display, an organic light emitting diode (OLED) display, a microelectromechanical system (MEMS) display, or an electronic paper display. The display 160 may, e.g., display various contents (e.g., a text, an image, video, an icon, and/or a symbol, etc.) to a user. The display 160 may include a touch screen, and may receive a touch, a gesture, proximity, or a hovering input, e.g., by using an electronic pen or a part of a body of a user.

The communication interface 170 may provide communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

Wireless communication may include a cellular communication protocol using at least one of, e.g., long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), etc. In some example embodiments, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). In some example embodiments, the wireless communication may include a global navigation satellite system (GNSS). The GNSS may include, e.g., at least one of a global positioning system (GPS), a global navigation satellite system (Glonass), a Beidou navigation satellite system (Beidou), and Galileo, the European global satellite-based navigation system. Herein, "GPS" may be used interchangeably with "GNSS". The wired communication may include, e.g., at least one of a universal serial bus (USB), a high definition multimedia interface (HDMI), a recommended standard 232 (RS-232), power line communication, a plain old telephone service (POTS), etc.

The network 162 may include a telecommunications network, e.g., at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101.

In some example embodiments, some or all of operations performed by the electronic device 101 may be performed in another electronic device or a plurality of electronic devices (e.g., the electronic device 102 or 104, or the server 106).

In some example embodiments, when the electronic device 101 performs a function or a service automatically or at a request, the electronic device 101 may request another device (e.g., the electronic devices 102 or 104 or the server 106) to perform at least some functions associated with the function or the service instead of or in addition to executing the function or the service. The other electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

In FIG. 1, each of the electronic devices 101, 102, and 104 may be referred to as a client device, and the server 106 may be referred to as a streaming server.

Figure 2:
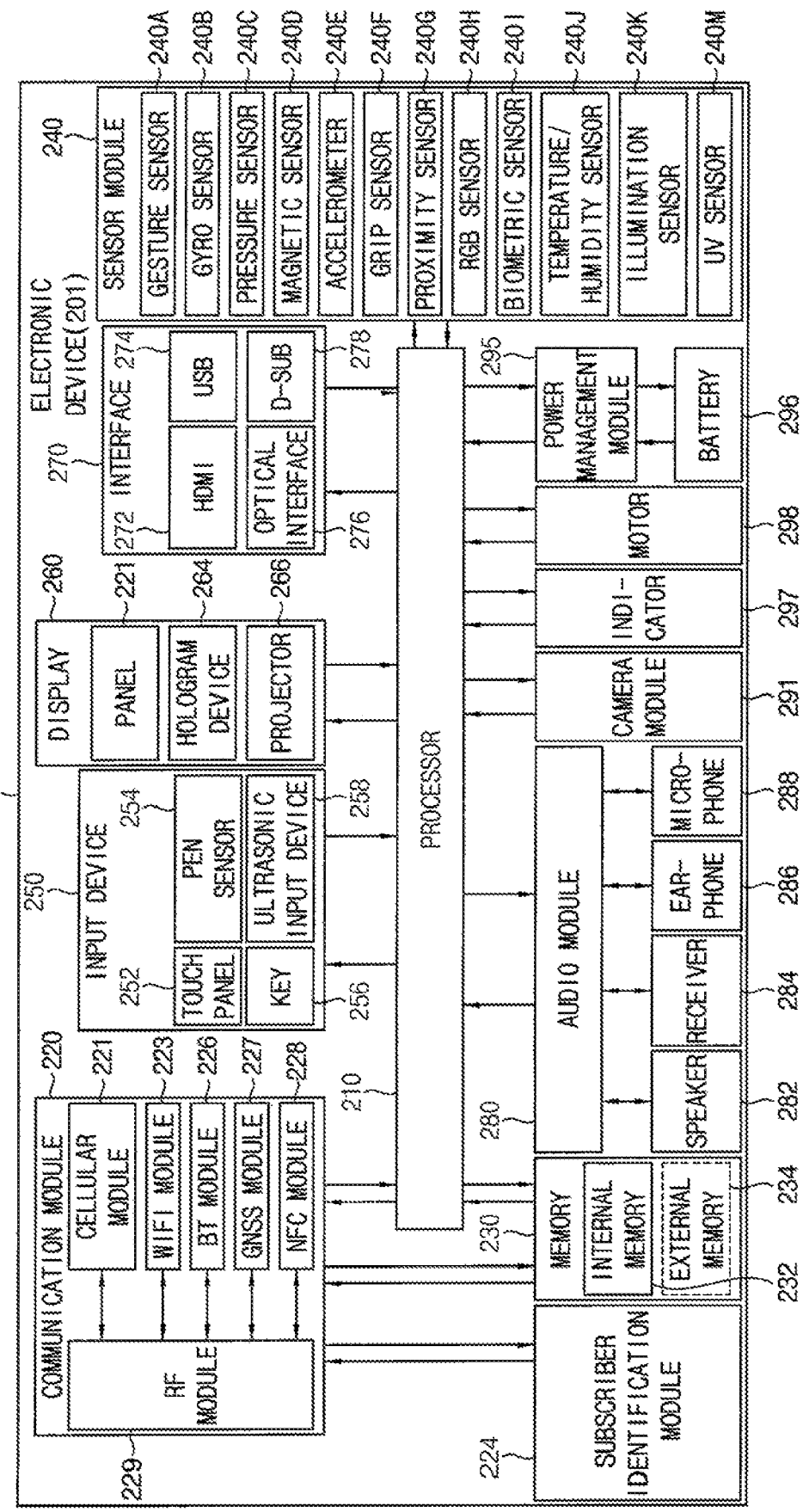
FIG. 2 is a block diagram illustrating an electronic device according to example embodiments.

FIG. 2 is a block diagram illustrating an electronic device according to example embodiments.

Referring to FIG. 2, an electronic device 201 may form the entire electronic device 101 illustrated in FIG. 1 or a part of the electronic device 101 illustrated in FIG. 1.

The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software components connected to the processor 210 by driving an operating system (OS) or an application program, and may perform processing and operations with respect to various data. The processor 210 may be implemented with, e.g., a system on chip (SoC). In some example embodiments, the processor 210 may include a graphic processing unit (GPU) and/or an image signal processor. The processor 210 may include at least some of the elements illustrated in FIG. 2 (e.g., the cellular module 221). The processor 210 may load an instruction or data received from at least one of other elements (e.g., a non-volatile memory) into a volatile memory to process the instruction or data, and store result data in the non-volatile memory.

The communication module 220 may have a configuration that is the same as or similar to the communication interface 170. The communication module 220 may include, e.g., the cellular module 221, a WiFi module 223, a Bluetooth (BT) module 226, a GNSS module 227, an NFC module 228, and a radio frequency (RF) module 229.

The cellular module 221 may provide, e.g., a voice call, a video call, a text service, or an Internet service over a communication network. In some example embodiments, the cellular module 221 may identify and authenticate the electronic device 201 in a communication network by using the SIM 224 (e.g., a SIM card). In some example embodiments, the cellular module 221 may perform at least one of functions that may be provided by the processor 210.

According to example embodiments, the cellular module 221 may include a communication processor (CP). In some example embodiments, at least some (e.g., two or more) of the cellular module 221, the WiFi module 223, the BT module 226, the GNSS module 227, and the NFC module 228 may be included in one integrated chip (IC) or IC package.

The RF module 229 may, e.g., transmit and receive a communication signal (e.g., an RF signal). The RF module 229 may include a transceiver, a power amplifier module (PAM), a frequency filter, a low noise amplifier (LNA), or an antenna. In some example embodiments, at least one of the cellular module 221, the WiFi module 223, the BT module 226, the GNSS module 227, and the NFC module 228 may transmit and receive an RF signal through the separate RF module.

The SIM 224 may, e.g., include a card including a SIM or an embedded SIM, and may include unique identification information (e.g., an integrated circuit card identifier (IC-CID) or subscriber information (e.g., an international mobile subscriber identity (IMSI)).

The memory 230 way correspond to the memory 130, and may, e.g., include an internal memory 232 and/or an external memory 234.

The internal memory 232 may, e.g., include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD).

The external memory 234 may further include flash drive, e.g., compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 may measure a physical quantity or sense an operation state of the electronic device 201 to convert the measured or sensed information into an electric signal. The sensor module 240 may, e.g., include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., red/green/blue (RGB) sensor), a biometric sensor 240I, a temperature/humidity sensor 240J, an illumination sensor 240K, and an ultraviolet (UV) sensor 240M.

Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some example embodiments, the electronic device 201 may further include a processor configured to control the sensor module 240 as part of or separately from the processor 210, e.g., to control the sensor module 240 during a sleep state of the processor 210.

The input device 250 may include, e.g., a touch panel 252, a (digital) pen sensor 254, a key 256, or an ultrasonic input device 258, although example embodiments are not limited thereto. The input device 250 may be configured to receive commands from outside of the electronic device 201. The touch panel 252 may use at least one of a capacitive type, a resistive type, an IR type, or an ultrasonic type. The touch panel 252 may further include a control circuit.

The touch panel 252 may further include a tactile or haptic layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 may sense ultrasonic waves generated by an input means through a microphone (e.g., the microphone 288) and check data corresponding to the sensed ultrasonic waves.

The display 260 may correspond to the display 160), and may include a panel 261, a hologram device 264, a projector 266, and/or a control circuit for controlling them. The panel 261 may be implemented to be flexible, transparent, or wearable. The panel 261 may be configured with the touch panel 252 in one module.

According to example embodiments, the panel 261 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201.

The interface 270 may include an HDMI 272, a USB 274, an optical interface 276, or a D-subminiature (D-sub) 278. The interface 270 may be included in the communication interface 170 illustrated in FIG. 1. Additionally or alternatively, the interface 270 may include a mobile high-definition link (MHL) interface, an SD/multi-media card (MMC) interface, or an Infrared Data Association (IrDA) interface.

The audio module 280 may bi-directionally convert sound and an electric signal. At least one element of the audio module 280 may be included in the I/O interface 150 illustrated in FIG. 1. The audio module 280 may process sound information input or output through the speaker 282, the receiver 284, the earphone 286, or the microphone 288.

The camera module 291 may be, e.g., a device capable of capturing a still image or a moving image, and according to some example embodiments, may include one or more image sensors (e.g., a front sensor or a rear sensor), a lens, an image signal processor (ISP), or a flash (e.g., an LED, a xenon lamp, etc.).

The power management module 295 may manage power of the electronic device 201. In some example embodiments, the power management module 295 may include a power management integrated circuit (PMIC), a charger IC, or a battery fuel gauge.

The PMIC may have a wired and/or wireless charging scheme. The wireless charging scheme may include a magnetic-resonance type, a magnetic induction type, and an electromagnetic type, and may further include an additional circuit for wireless charging, e.g., a coil loop, a resonance circuit, or a rectifier. The battery gauge may measure the remaining capacity of the battery 296 or the voltage, current, or temperature of the battery 296 during charging. The battery 296 may include, e.g., a rechargeable battery and/or a solar battery.

The indicator 297 may display a particular state, e.g., a booting state, a message state, or a charging state, of the electronic device 201 or a part thereof (e.g., the processor 210). The motor 298 may convert an electric signal into mechanical vibration or generate vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™.

Figure 3:
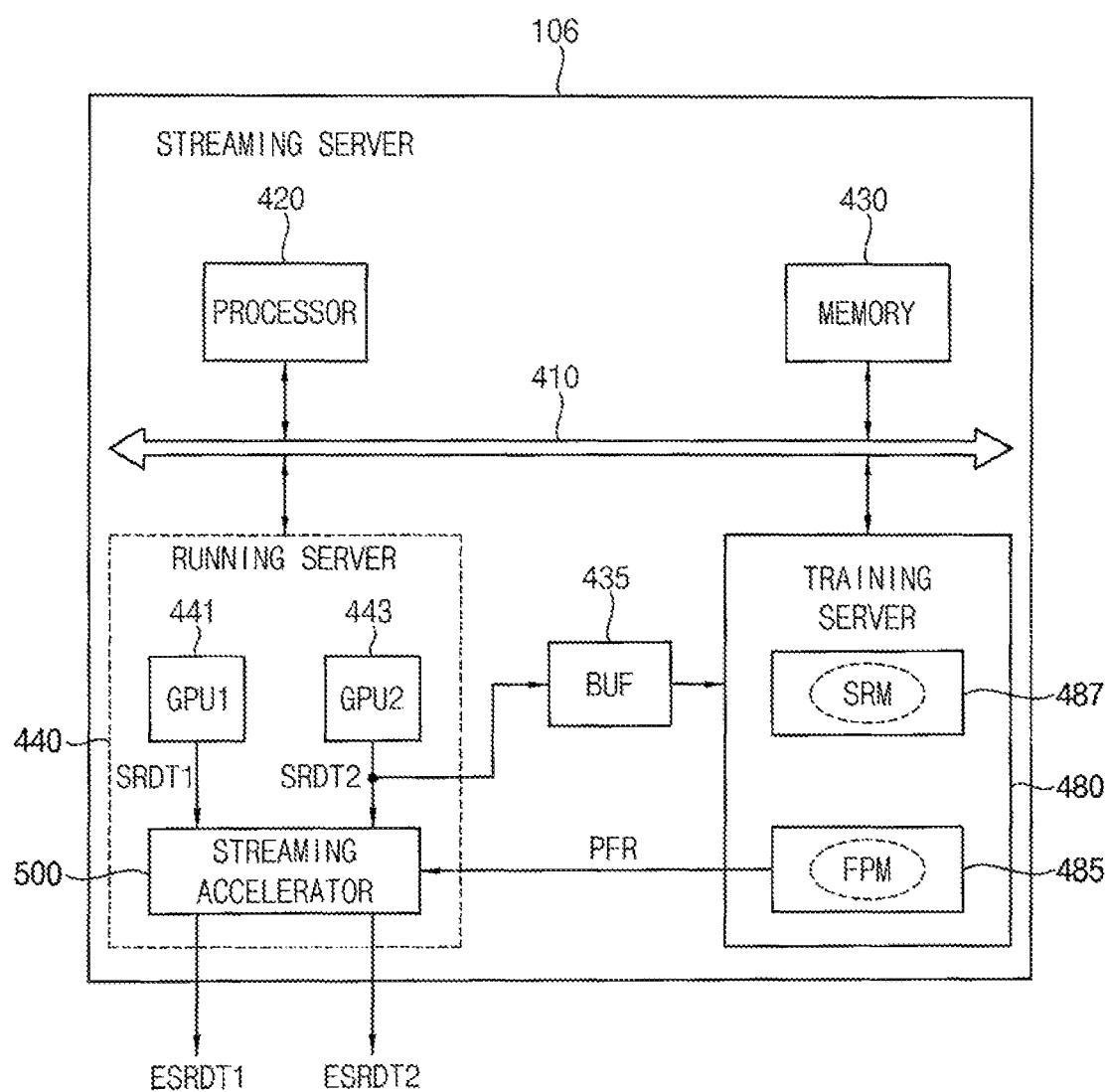
FIG. 3 is a block diagram illustrating an example of the streaming server in FIG. 1 according to example embodiments.

FIG. 3 is a block diagram illustrating an example of the streaming server in FIG. 1 according to example embodiments.

Referring to FIG. 3, the streaming server 106 may include a processor 420, a memory 430, a running server 440, a buffer 435, and a training server 480. The processor 420, the memory 430, the running server 440, and the training server 480 may be operatively coupled to each other through a bus 410.

The running server 440 may include a first graphic processing unit (GPU) 441, a second GPU 443, and a streaming accelerator 500. The training server 480 may store a neural network that implements a frame prediction model FPM 485 and a super resolution mode SRM 487.

The memory 430 may store instructions. The processor 420 may execute the instructions stored in the memory 430 to control the running server 440 and the training server 480 to perform specific operations.

The first GPU 441 may generate a first streaming data SRDT1 associated with a game, a virtual reality, or an augmented reality, and may provide the first streaming data SRDT1 to the streaming accelerator 500. The second GPU 443 may generate a second streaming data SRDT2 associated with a game, a virtual reality, or an augmented reality, and may provide the second streaming data SRDT2 to the streaming accelerator 500 and the buffer 435. The buffer 435 may store the second streaming data SRDT2 on frame basis, and may provide the frames of the second streaming data SRDT2 to the training server 480.

The training server 480 may apply the second streaming data SRDT2 to the frame prediction model FPM and the super resolution mode SRM to train the frame prediction model FPM and the super resolution mode SRM.

When the training on the frame prediction model FPM and the super resolution mode SRM is completed, the training server 480 may provide a predicted frame PFR from the frame prediction model FPM to the streaming accelerator 500.

The streaming accelerator 500 may use the predicted frame PFR from the frame prediction model FPM. For example, the streaming accelerator 500 may encode a subject frame of each of the first streaming data SRDT1 and the second streaming data SRDT2 by referring to a higher-similarity frame selected from a previous frame of each of the first streaming data SRDT1 and the second streaming data SRDT2 and the predicted frame PFR, which selected frame has a higher similarity with the subject frame, to generate a first encoded streaming data ESRDT1 and a second encoded streaming data ESRDT2. The streaming accelerator 500 may transmit the first encoded streaming data ESRDT1 and the second encoded streaming data ESRDT2 to a first client device and a second client device, respectively.

When the streaming accelerator 500 encodes the first streaming data SRDT1 and the second streaming data SRDT2, the streaming accelerator 500 may encode the streaming data SRDT1 and the second streaming data SRDT2 through separate paths to generate the first encoded streaming data ESRDT1 and the second encoded streaming data ESRDT2. Therefore, the streaming accelerator 500 may enhance processing speed when the streaming accelerator 500 encodes a plurality of streaming data.

Figure 4:
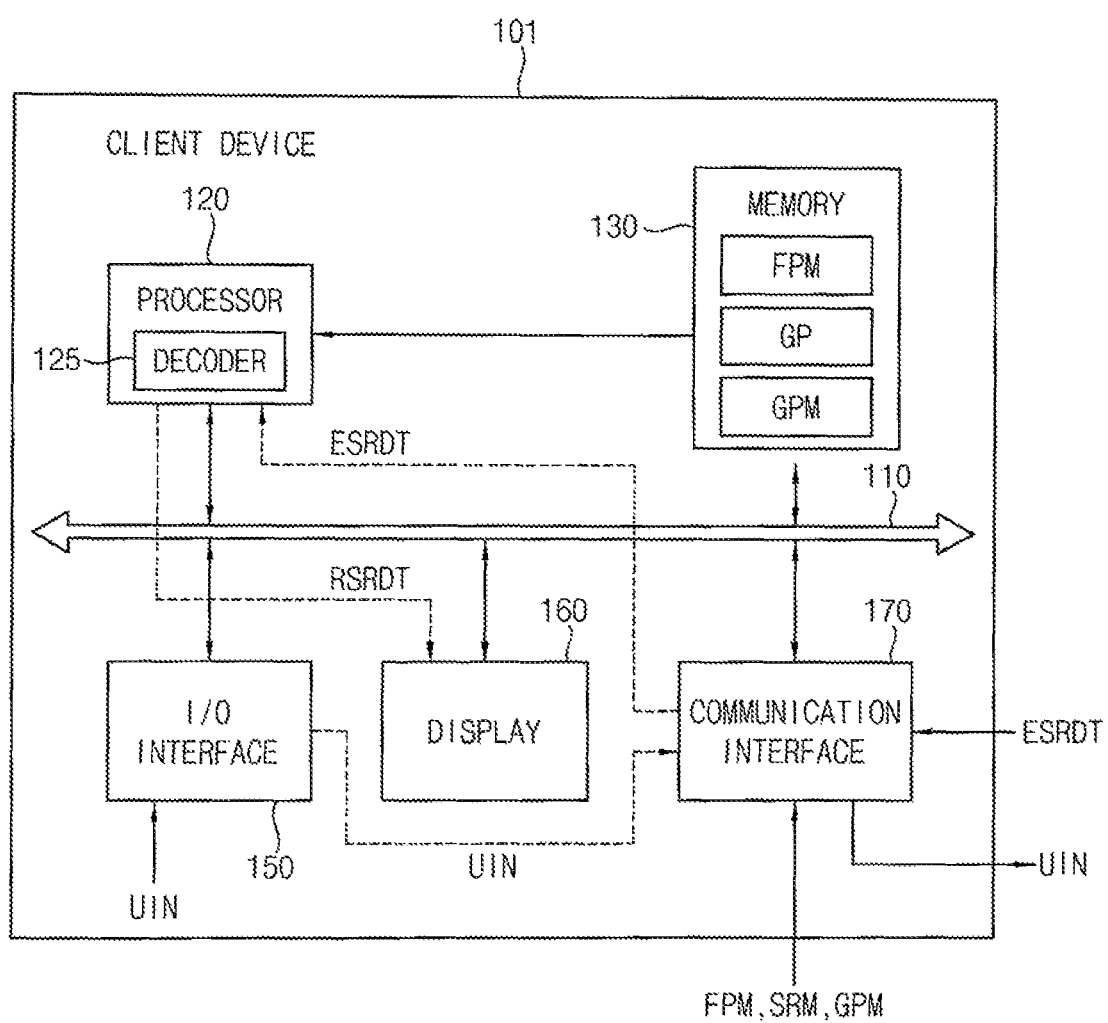
FIG. 4 is a block diagram illustrating an example of the client device in FIG. 1 according to example embodiments.

FIG. 4 is a block diagram illustrating an example of the client device in FIG. 1 according to example embodiments.

Referring to FIG. 4, the client device 101 may include a processor 120, a memory 130, an I/O interface 150, a display 160, and a communication interface 170. The processor 120, the memory 130, the I/O interface 150, the display 160, and the communication interface 170 may be coupled to each other through a bus 110.

The memory 130 may store instructions. The processor 120 may execute the instructions stored in the memory 130 to control the I/O interface 150, the display 160, and the communication interface 170 to perform specific operations.

The I/O interface 150 may receive a user input UIN, and may provide the user input UIN to the communication interface 170.

The communication interface 170 may receive the user input UIN, and may transmit the user input UIN to the streaming server 106. The communication interface 170 may receive encoded streaming data ESRDT from the streaming server 106, may receive various neural network models (such as frame prediction model FPM, super resolution mode SRM and graphic patch model GPM), may store the neural network models (such as frame prediction model FPM and the super resolution mode SRM) in the memory 130, and may provide the encoded streaming data ESRDT to a decoder 125 in the processor 120.

The processor 120 may apply the user input UIN and the encoded streaming data ESRDT to at least a portion of the neural network models (such as frame prediction model FPM and the super resolution mode SRM), and may decode the encoded streaming data ESRDT to generate a recovered streaming data RSRDT. The processor 120 may provide the recovered streaming data RSRDT to the user by displaying the recovered streaming data RSRDT in the display 160.

Referring to the recovered streaming data RSRDT displayed in the display 160, the user may play a game implemented by the recovered streaming data RSRDT by applying the user input UIN to the recovered streaming data RSRDT.

Figure 5:
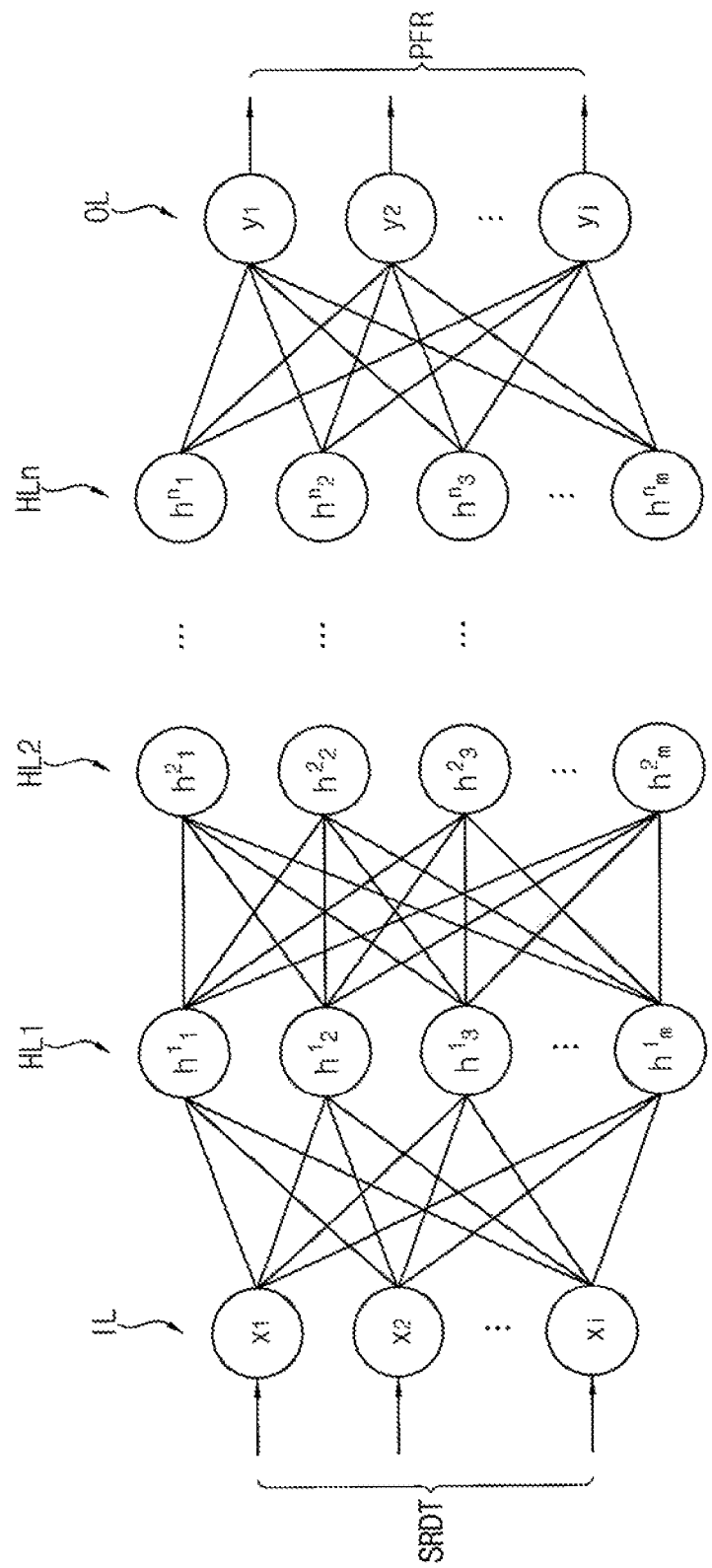
FIGS. 5 and 6 are diagrams for describing an example of a neural network in FIG. 3 according to example embodiments.
Figure 6:
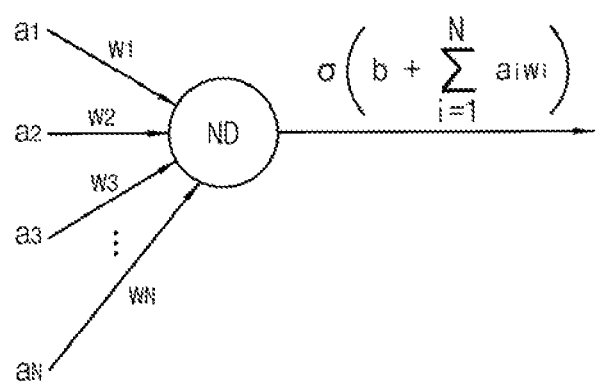

FIGS. 5 and 6 are diagrams for describing an example of a neural network in the training server 480 of FIG. 3 according to example embodiments.

Referring to FIG. 5, a general neural network may include an input layer IL, a plurality of hidden layers HL1, HL2, HLn, and an output layer OL.

The input layer IL may include i input nodes $x_1$, $x_2$, ..., $x_i$, where i is a natural number. Input data (e.g., vector input data) DAT whose length is i may be input to the input nodes $x_1$, $x_2$, ..., $x_i$ such that each element of streaming data SRDT is input to a respective one of the input nodes $x_1$, $x_2$, ..., $x_i$.

The plurality of hidden layers HL1, HL2, HLn may include n hidden layers, where n is a natural number, and may include a plurality of hidden nodes $h^1_1$, $h^1_2$, $h^1_3$, $h^1_m$, $h^2_1$, $h^2_2$, $h^2_3$, ..., $h^2_m$, $h''_1$, $h''_2$, $h''_3$, $h''_m$. For example, the hidden layer HL1 may include m hidden nodes $h^1_1$, $h^1_2$, ..., $h^1_3$, ..., $h^1_m$, the hidden layer HL2 may include m hidden nodes $h^2_1$, $h^2_2$, $h^2_3$, ..., $h^2_m$, and the hidden layer HLn may include m hidden nodes $h''_1$, $h''_2$, $h''_3$, ..., $h''_m$, where m is a natural number.

The output layer OL may include j output nodes $y_1$, $y_2$, ..., $y_j$, where j is a natural number. Each of the output nodes $y_1$, $y_2$, ..., $y_j$ may correspond to a respective one of classes to be categorized. The output layer OL may provide output values (e.g., class scores or simply scores) or the predicted frame PFR associated with the input data for each of the classes. The output layer OL may be referred to as a fully-connected layer and may indicate, e.g., a probability that the predicted frame PFR corresponds to an expected frame.

A structure of the neural network illustrated in FIG. 5 may be represented by information on branches (or connections) between nodes illustrated as lines, and a weighted value assigned to each branch, which is not illustrated. Nodes within one layer may not be connected to one another, but nodes of different layers may be fully or partially connected to one another.

Each node (e.g., the node WO may receive an output of a previous node (e.g., the node $x_1$), may perform a computing operation, computation, or calculation on the received output, and may output a result of the computing operation, computation, or calculation as an output to a next node (e.g., the node $h^2_1$). Each node may calculate a value to be output by applying the input to a specific function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

Referring to FIG. 6, an example of an operation performed by one node ND included in the neural network of FIG. 5 is illustrated in detail.

When N inputs $a_1$, $a_2$, $a_3$, ..., $a_N$ are provided to the node ND, the node ND may multiply the N inputs $a_1$, $a_2$, $a_3$, ..., $a_N$ and corresponding N weights $w_1$, $w_2$, $w_3$, ..., $w_N$, respectively, may sum N values obtained by the multiplication, may add an offset "b" to a summed value, and may generate one output value (e.g., "z") by applying a value to which the offset "b" is added to a specific function "σ".

When one layer included in the neural network illustrated in FIG. 5 includes M nodes ND illustrated in FIG. 6, output values of the one layer may be obtained by Equation 1.

$$W*A=Z \qquad \text{[Equation 1]}$$

In Equation 1, "W" represents weights for all connections included in the one layer, and may be implemented in an M*N matrix form. "A" represents the N inputs $a_1$, $a_2$, $a_3$, ..., $a_N$ received by the one layer, and may be implemented in an N*1 matrix form. "Z" represents M outputs $z_1$, $z_2$, $z_3$, ..., $z_M$ output from the one layer, and may be implemented in an M*1 matrix form.

Figure 7A:
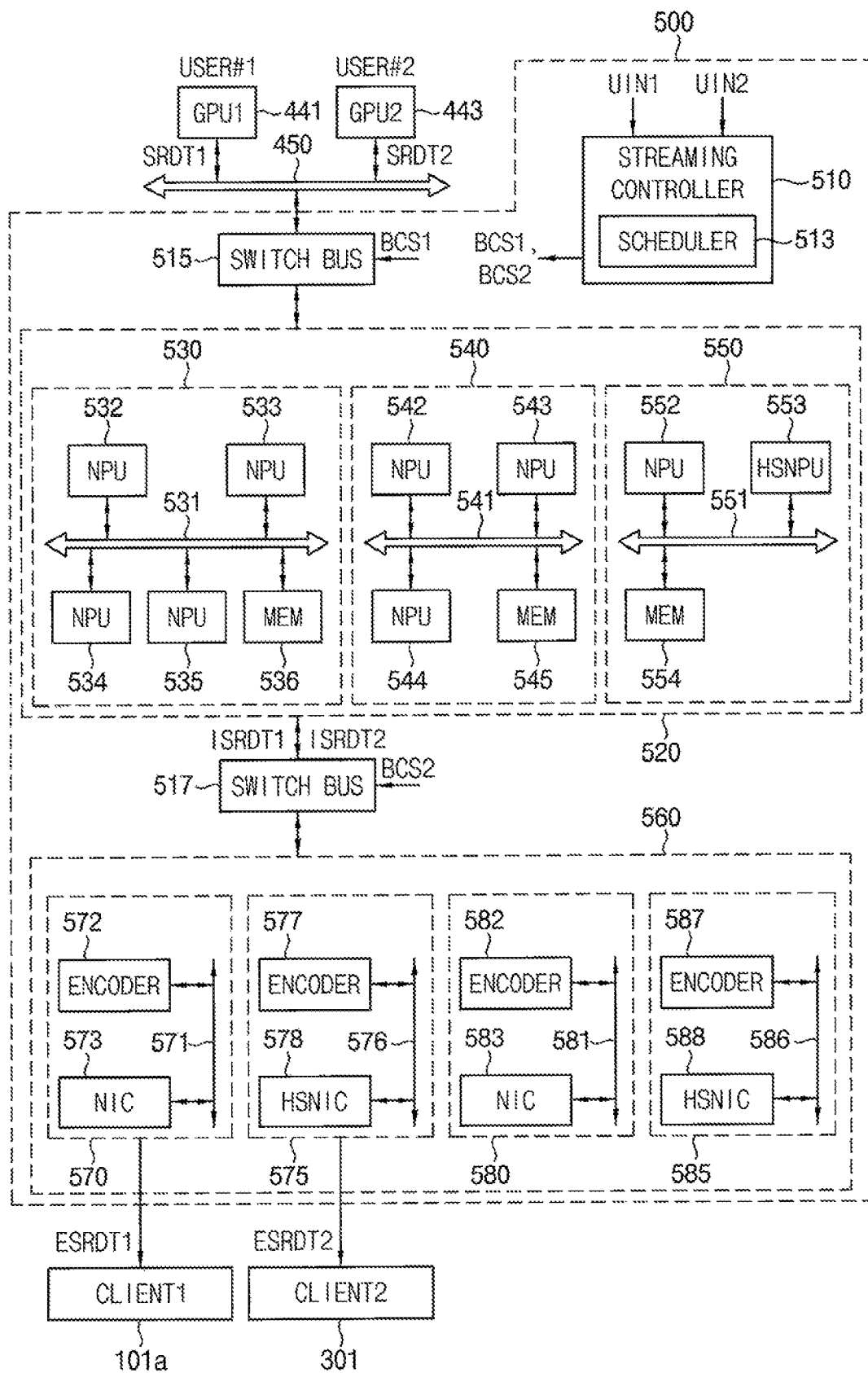
FIG. 7A is a block diagram illustrating an example of the streaming accelerator in the streaming server of FIG. 3 according to example embodiments.

FIG. 7A is a block diagram illustrating an example of the streaming accelerator 500 in the streaming server 106 of FIG. 3 according to example embodiments.

In FIG. 7A, the first GPU 441, the second GPU 443, a first client device 101a, and a second client device 301 are illustrated together for convenience of explanation.

Referring to FIG. 7A, the streaming accelerator 500 may include a streaming controller 510, a first switch bus 515, a first pool 520, a second switch bus 517, and a second pool 560.

The first switch bus 515 may be connected to the first GPU 441 and the second GPU 443 through a system bus 450.

The first pool 520 may include a plurality of neural processing unit (NPU) bundles 530, 540, and 550. Each of the plurality of NPU bundles 530, 540, and 550 may include a plurality of NPUs. The second pool 560 may include a plurality of network interface card (NIC) bundles 570, 575, 580, and 585. Each of the plurality of NIC bundles 570, 575, 580, and 585 may include an encoder and a NIC. Here, a bundle means a set or group. The bundle may be referred to as a cluster or a group.

The streaming controller 510 may generate a first bus control signal BCS1 and a second bus control signal BCS2 based on a first user input UIN1 from a first user USER #1 and a second user input UIN2 from a second user USER #2. The streaming controller 510 may provide the first bus control signal BCS1 and the second bus control signal BCS2 to the first switch bus 515 and the second switch bus 517, respectively.

The streaming controller 510 may include a scheduler 513. The scheduler 513 may schedule a selection and/or setting of the plurality of NPU bundles 530, 540, and 550, and may schedule a selection and/or setting of the plurality of NIC bundles 570, 575, 580, and 585 based on the first user input UIN1 and the second user input UIN2.

The first switch bus 515, in response to the first bus control signal BCS1, may provide the first streaming data SRDT1 (corresponding to the first user USER #1) and the second streaming data SRDT2 (corresponding to the second user USER #2) to a first selected NPU bundle (for example, the NPU bundle 530) and a second selected NPU bundle (for example, the NPU bundle 540) from among the plurality of NPU bundles 530, 540, and 550, respectively.

The first switch bus 515 may provide separate paths in which the first streaming data SRDT1 and the second streaming data SRDT2 are processed.

The first selected NPU bundle may apply the first streaming data SRDT1 to at least a portion of a plurality of first neural network models to generate a first intermediate streaming data ISRDT1, and may output the first intermediate streaming data ISRDT1. The second selected NPU bundle may apply the second streaming data SRDT2 to at least a portion of a plurality of second neural network models to generate a second intermediate streaming data ISRDT2, and may output the second intermediate streaming data ISRDT2.

A first NPU bundle 530 may include first NPUs 532, 533, 534, and 535 and a first memory 536 connected to a first internal bus 531.

The first memory 536 may store neural network models among from which at least a portion are different, and the first NPUs 532, 533, 534, and 535 may perform neural network operation (for example, deep learning or machine learning) based on the neural network models stored in the first memory 536.

A second NPU bundle 540 may include second NPUs 542, 543, and 544 and a second memory 545 connected to a second internal bus 541. The second memory 545 may store neural network models among from which at least a portion are different, and the second NPUs 542, 543, and 544 may perform neural network operation based on the neural network models stored in the second memory 545.

A third NPU bundle 550 may include second NPUs 552 and 553 and a third memory 554 connected to a third internal bus 551. The NPU 553 may be a high specification NPU (HSNPU). The third memory 554 may store neural network models among from which at least a portion are different, and the third NPUs 552 and 553 may perform neural network operation based on the neural network models stored in the third memory 554.

At least two of the NPU bundles 530, 540, and 550 may have different performance. The first switch bus 515 may determine one of the NPU bundles 530, 540, and 550 as the first selected NPU bundle, and may determine another of the NPU bundles 530, 540, and 550 as the second selected NPU bundle. The first selected NPU bundle and the second selected NPU bundle may provide separate paths to the first streaming data SRDT1 and the second streaming data SRDT2.

The second switch bus 517 may be connected between the first pool 520 and the second pool 560. The second switch bus 517 may receive the first intermediate streaming data ISRDT1 and the second intermediate streaming data ISRDT2 from the first selected NPU bundle and the second selected NPU bundle, respectively, and may provide the first intermediate streaming data ISRDT1 and the second intermediate streaming data ISRDT2 to a first selected NIC bundle and a second selected NIC bundle from among the NIC bundles 570, 575, 580, and 585, respectively, in response to the second bus control signal BCS2.

The first selected NIC bundle (the NIC bundle 570) may encode the first intermediate streaming data ISRDT1 to generate a first encoded streaming data ESRDT1, and may provide the first encoded streaming data ESRDT1 to the first client device 101a. The second selected NIC bundle (the NIC bundle 575) may encode the second intermediate streaming data ISRDT2 to generate a second encoded streaming data ESRDT2, and may provide the second encoded streaming data ESRDT2 to the second client device 301.

A first NIC bundle 570 may include a first encoder 572 and a first NIC 573 connected to a first internal bus 571. A second NIC bundle 575 may include a second encoder 577 and a second NIC 578 connected to a second internal bus 576. A third NIC bundle 580 may include a third encoder 582 and a third NIC 583 connected to a third internal bus 581. A fourth NIC bundle 585 may include a fourth encoder 587 and a fourth NIC 588 connected to a fourth internal bus 586.

At least two of the encoders 572, 577, 582, and 587 may be of different kinds, and at least two of the NICs 573, 578, 583, and 588 may have different performance. Each of the NICs 578 and 588 may be a high specification NIC (HSNIC).

The second switch bus 517 may determine at least two from among the NIC bundles 570, 575, 580, and 585 as the first selected NIC bundle and the second selected NIC bundle in response to the second bus control signal BCS2, and may provide separate paths in which the first intermediate streaming data ISRDT1 and the second intermediate streaming data ISRDT2 are processed.

In FIG. 7A, the first selected NPU bundle and the first selected NIC bundle provide a first path via which the first streaming data SRDT1 passes, the second selected NPU bundle and the second selected NIC bundle provide a second path via which the second streaming data SRDT2 passes, and the first path is independent from the second path.

Figure 7B:
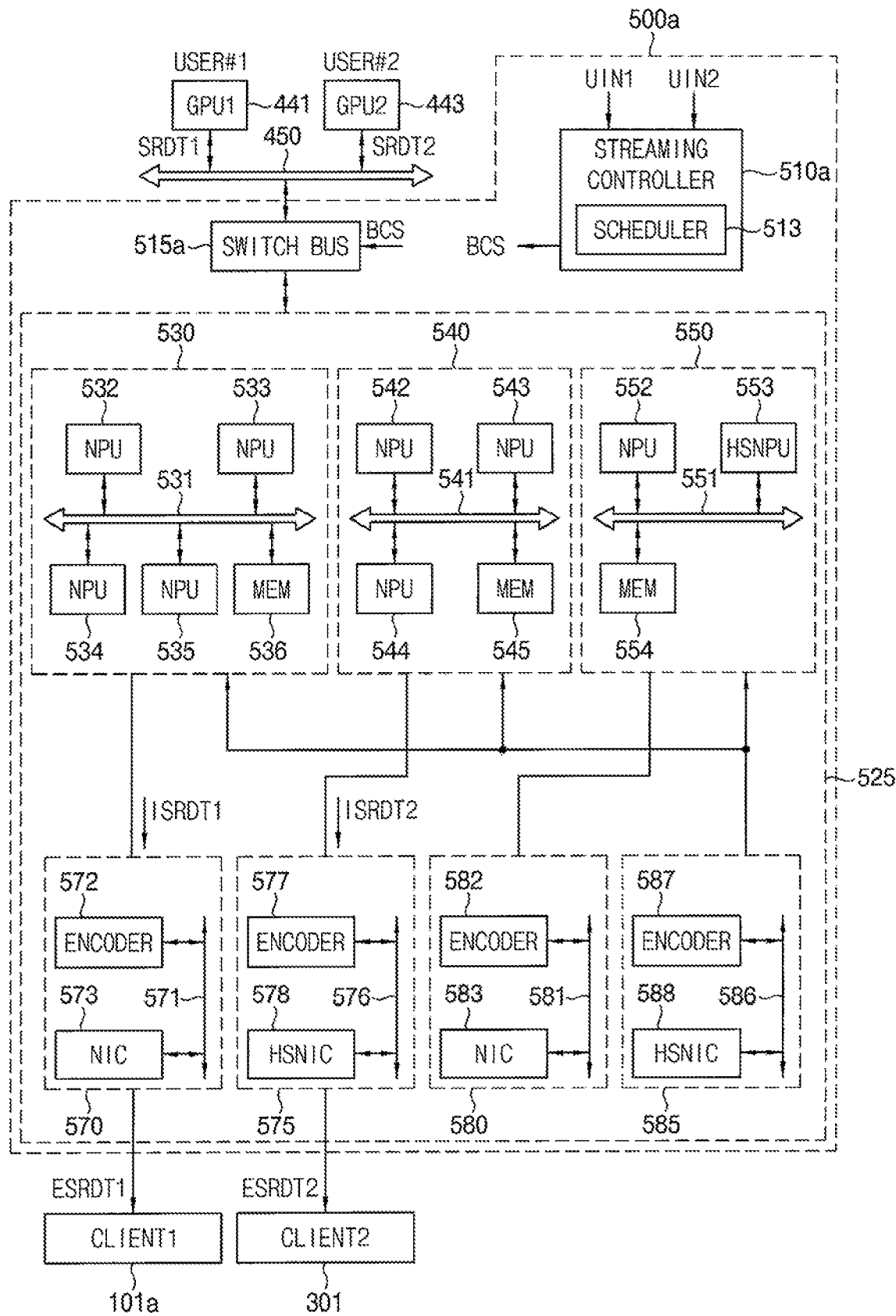
FIG. 7B is a block diagram illustrating another example of the streaming accelerator in the streaming server of FIG. 3 according to example embodiments.

FIG. 7B is a block diagram illustrating another example of the streaming accelerator 500 in the streaming server 106 of FIG. 3 according to example embodiments.

In FIG. 7B, the first GPU 441, the second GPU 443, the first client device 101a, and the second client device 301 are illustrated together for convenience of explanation.

Referring to FIG. 7B, a streaming accelerator 500a may include a streaming controller 510a, a first switch bus 515a, and a pool 525.

The streaming controller 510a may generate a bus control signal BCS based on the first user input UIN1 from a first user USER #1 and the second user input UIN2 from a second user USER #2, and may provide the bus control signal BCS to the first switch bus 515a.

The first switch bus 515a may be connected to the first GPU 441 and the second GPU 443 through a system bus 450.

The pool 525 may include a plurality of NPU bundles 530, 540, and 550 and a plurality of NIC bundles 570, 575, 580, and 585. Each of the NIC bundles 570, 575 and 580 are connected to respective one of the NPU bundles 530, 540, and 550 and the NIC bundle 585 may be dedicated to a repository server 590, e.g., an external repository server, in FIG. 9.

Configuration and operation of each of the NPU bundles 530, 540, and 550 and configuration and operation of each of the NIC bundles 570, 575 and 580 may be substantially similar with configuration and operation described with reference to FIG. 7A.

The first switch bus 515a, in response to the bus control signal BCS, may provide the first streaming data and the second streaming data SRDT2 to a first selected NPU bundle and a second selected NPU bundle from among the plurality of NPU bundles 530, 540, and 550, respectively. In FIG. 7B, it is assumed that the NPU bundle 530 may be the first selected NPU bundle and the NPU bundle 540 may be the second selected NPU bundle. The first selected NPU bundle may apply the first streaming data SRDT1 to at least a portion of a plurality of first neural network models to generate a first intermediate streaming data ISRDT1, and may provide the first intermediate streaming data ISRDT1 to the corresponding NIC bundle 570. The second selected NPU bundle may apply the second streaming data SRDT2 to at least a portion of a plurality of second neural network models to generate a second intermediate streaming data ISRDT2, and may provide the second intermediate streaming data ISRDT2 to the corresponding NIC bundle 575.

The NIC bundle 570 may encode the first intermediate streaming data ISRDT1 to generate a first encoded streaming data ESRDT1, and may provide the first encoded streaming data ESRDT1 to the first client device 101a. The NIC bundle 575 may encode the second intermediate streaming data ISRDT2, to generate a second encoded streaming data ESRDT2 and may provide the second encoded streaming data ESRDT2 to the second client device 301.

In FIG. 7B, a selected NPU bundle and a NIC bundle corresponding to the selected NPU bundle constitutes one pair, and the one pair encodes the streaming data to output the encoded streaming data.

Figure 8:
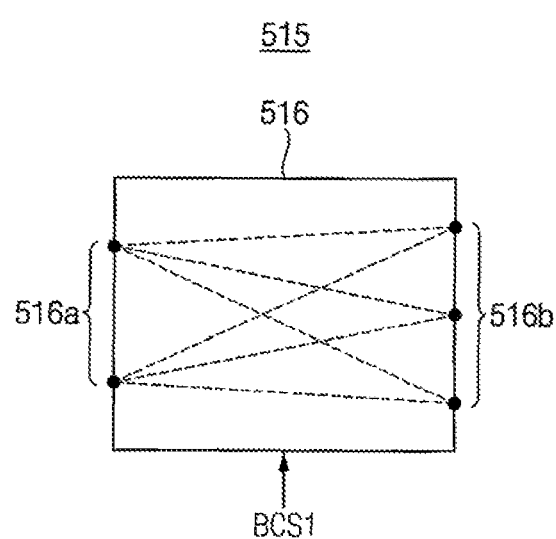
FIG. 8 illustrates an example of the first switch bus in the streaming accelerator in FIG. 7A according to example embodiments.

FIG. 8 illustrates an example of the first switch bus 515 in the streaming accelerator 500 in FIG. 7A according to example embodiments.

Referring to FIG. 8, the first switch bus 515 may include a crossbar switch 516. The crossbar switch 516 may include a plurality of input terminals 516a and a plurality of output terminals 516b which are connected to each other, and may provide separate bus paths which do not overlap between the input terminals 516a and the output terminals 516b in response to the first bus control signal BCS1.

The second switch bus 517 in FIG. 7A may include a crossbar switch which is substantially similar with the crossbar switch 516 of FIG. 8.

Figure 9:
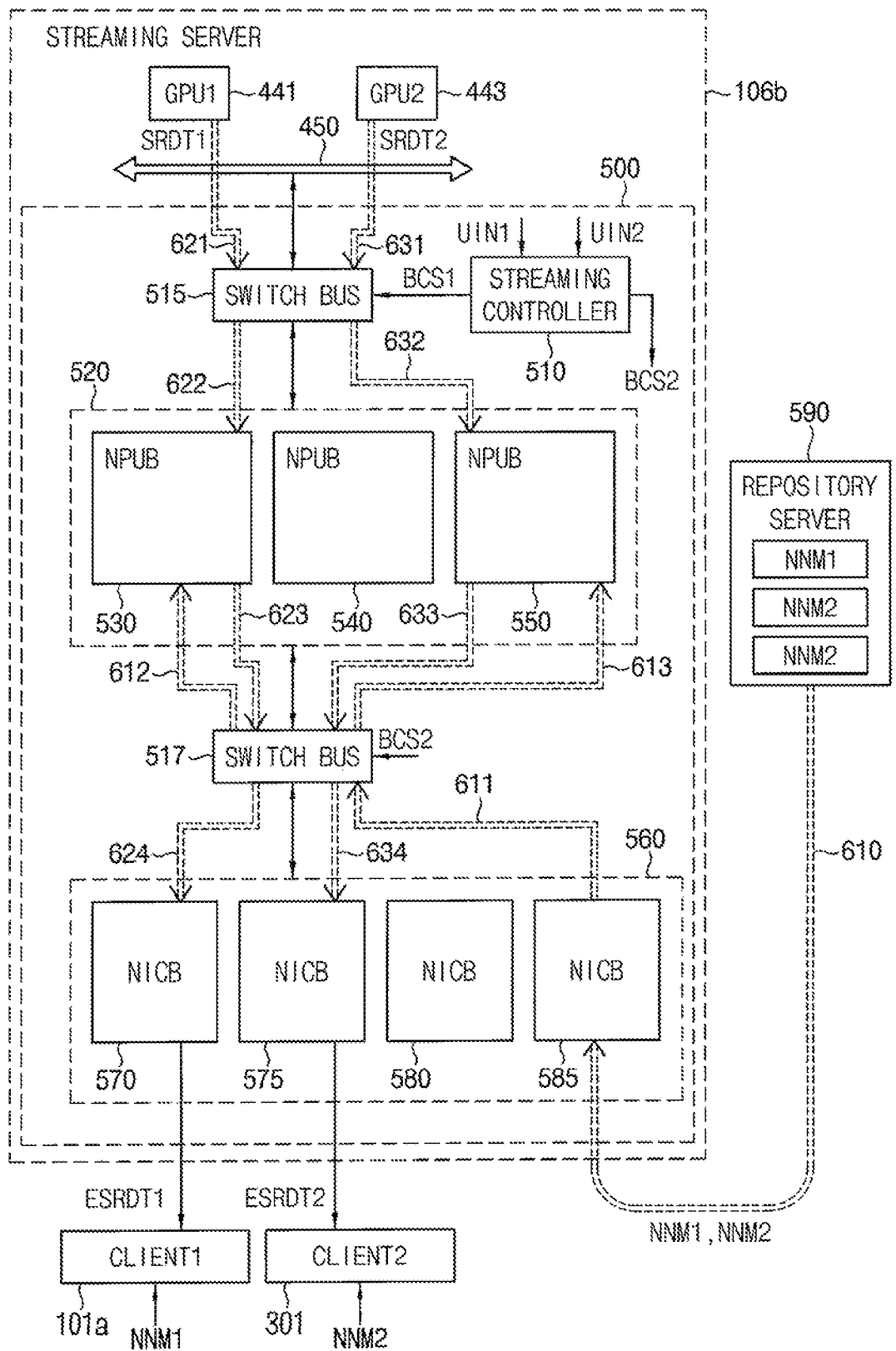
FIG. 9 illustrates an example operation of the streaming accelerator in FIG. 7A according to example embodiments.

FIG. 9 illustrates an example operation of the streaming accelerator 500 in FIG. 7A according to example embodiments.

Referring to FIG. 9, a streaming system 100b may include a streaming server 106b, a repository server 590, a first client device 101a, and a second client device 301. The streaming server 106b may include a first GPU 441, a second GPU 443, and the streaming accelerator 500.

In FIG. 9, it is assumed that the first switch bus 515 determines the NPU bundle (NPUB) 530 as the first selected NPU bundle and determines the NPU bundle 550 as the second selected NPU bundle from among the NPU bundles 530, 540, and 550 in response to the first bus control signal BCS1, and it is assumed that the second switch bus 517 determines the NIC bundle (NICB) 570 as the first selected NIC bundle and determines the NIC bundle 575 as the second selected NIC bundle from among the NIC bundles 570, 575, 580 and 580 in response to the second bus control signal BCS2. In addition, the NIC bundle 585 may be dedicated to the repository server 590.

The repository server 590 may store a plurality of neural network models NNM1, NNM2, and NNM3, or may pre-compile and store pre-compiled network models (e.g., pre-compile and store pre-complied versions of the neural network models NNM1, NNM2, and NNM3), and may provide the neural network models NNM1 and NNM2 to the NIC bundle 585 through a path 610.

The NIC bundle 585 may provide the neural network models NNM1 and NNM2 to the second switch bus 517 through a path 611. The neural network models NNM1 and NNM2 may be loaded from the second switch bus 517 to the first selected NPU bundle 530 and the second selected NPU bundle 550 through paths 612 and 613, respectively. The neural network model NNM1 may be loaded to the first memory 536 (see FIG. 7A) in the first selected NPU bundle 530. The neural network model NNM2 may be loaded to the third memory 554 (see FIG. 7A) in the second selected NPU bundle 550.

The first GPU 441 may provide the first streaming data SRDT1 to the first switch bus 515 through a path 621. The second GPU 443 may provide the second streaming data SRDT2 to the first switch bus 515 through a path 631.

The first switch bus 515, in response to the first bus control signal BCS1, may provide the first streaming data SRDT1 to the first selected NPU bundle 530 through a path 622, and provide the second streaming data SRDT2 to the second selected NPU bundle 550 through a path 632.

The first selected NPU bundle 530 may apply the neural network model NNM1 to the first streaming data SRDT1 to generate the first intermediate streaming data ISRDT1, and provide the first intermediate streaming data ISRDT1 to the second switch bus 517 through a path 623. The second selected NPU bundle 550 may apply the neural network model NNM2 to the second streaming data SRDT2 to generate the second intermediate streaming data ISRDT2, and provide the second intermediate streaming data ISRDT2 to the second switch bus 517 through a path 633.

The second switch bus 517, in response to the second bus control signal BCS2, may provide the first intermediate streaming data ISRDT1 to the first selected NIC bundle 570 through a path 624 and provide the second intermediate streaming data ISRDT2 to the second selected NIC bundle 575 through a path 634.

The first encoder 572 (see FIG. 7A) in the first selected NIC bundle 570 may encode the first intermediate streaming data ISRDT1 to generate the first encoded streaming data ESRDT1, and provide the first encoded streaming data ESRDT1 to the first client device 101a via the first NIC 573 (see FIG. 7A). The first client device 101a may decode the first encoded streaming data ESRDT1 based on the neural network model NNM1 received from the repository server 590.

The second encoder 577 (see FIG. 7A) in the second selected NIC bundle 575 may encode the second intermediate streaming data ISRDT2 to generate the second encoded streaming data ESRDT2, and provide the second encoded streaming data ESRDT2 to the second client device 301 via the second NIC 578 (see FIG. 7A). The second client device 301 may decode the second encoded streaming data ESRDT2 based on the neural network model NNM2 received from the repository server 590.

Figure 10:
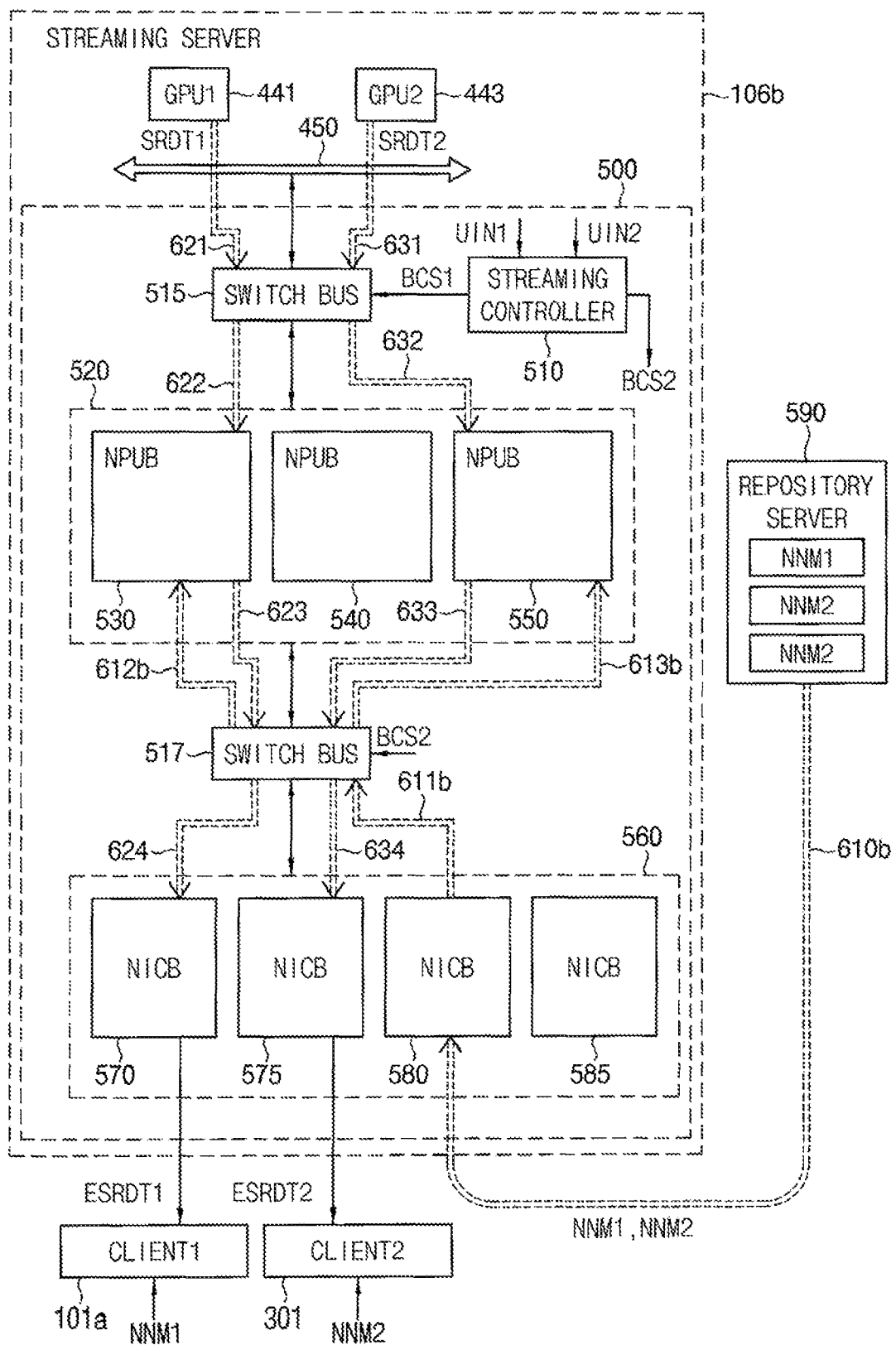
FIG. 10 illustrates another example operation of the streaming accelerator in FIG. 7A according to example embodiments.

FIG. 10 illustrates another example operation of the streaming accelerator 500 in FIG. 7A according to example embodiments.

Referring to FIG. 10, the repository server 590 may store a plurality of neural network models NNM1, NNM2, and NNM3, and may provide the neural network models NNM1 and NNM2 to the NIC bundle 580 through a path 610b.

The NIC bundle 580 may provide the neural network models NNM1 and NNM2 to the second switch bus 517 through a path 611b. The neural network models NNM1 and NNM2 may be loaded from the second switch bus 517 to the first selected NPU bundle 530 and the second selected NPU bundle 550 through paths 612b and 613b, respectively. The NIC bundle 580 is not associated with encoding operation and may be undedicated to the repository server 590 (as explained further below). Other operations are substantially the same as the operations described with reference to FIG. 9.

In FIG. 9, a NIC bundle which is not used for encoding operation (from among the NIC bundles 570, 575, 580, and 585) may transmit the neural network models to the second switch bus 517. In FIG. 9, the repository server 590 loads the neural network models NNM1 and NNM2 to the first selected NPU bundle and the second selected NPU bundle through the NIC bundle 585 which is dedicated to the repository server 590, whereas in FIG. 10, the repository server 590 loads the neural network models NNM1 and NNM2 to the first selected NPU bundle and the second selected NPU bundle through the NIC bundle 580 which is undedicated to the repository server 590.

Figure 11:
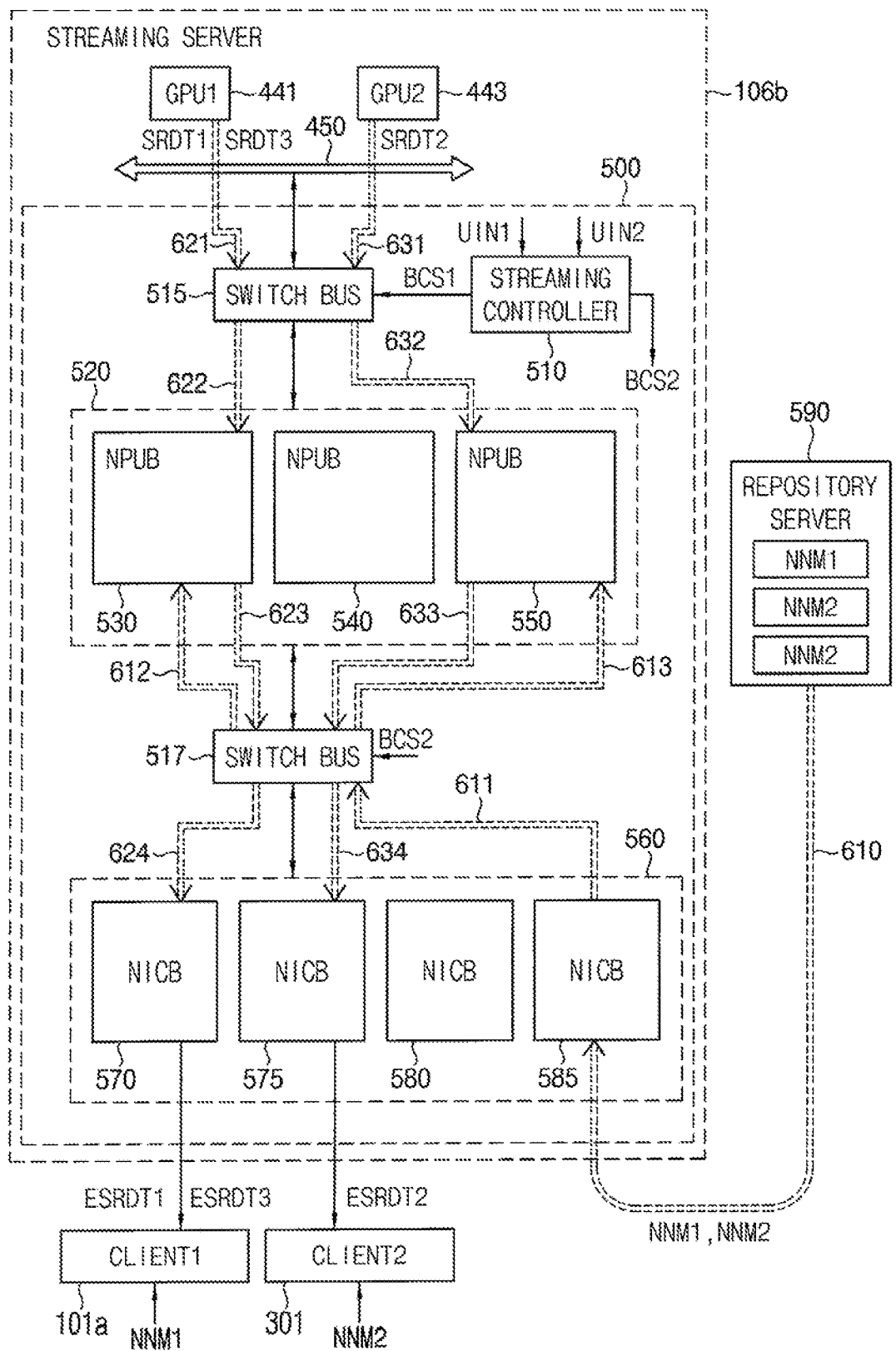
FIG. 11 illustrates an example operation of the streaming accelerator in FIG. 7A according to example embodiments.

FIG. 11 illustrates an example operation of the streaming accelerator 500 in FIG. 7A according to example embodiments. Description repeated with respect to FIG. 9 will be omitted.

Referring to FIG. 11, operation in FIG. 11 differs from the operation of FIG. 9 in that the first GPU 441 provides the first streaming data SRDT1 and a third streaming data SRDT3 to the first switch bus 515 through the path 621, the first selected NPU bundle 530 processes the first streaming data SRDT1 and the third streaming data SRDT3 to provide a result of the processing to the second switch bus 517, and the first selected NIC bundle 570 encodes an output of the first selected NPU bundle 530 to output the first encoded streaming data ESRDT1 and a third encoded streaming data ESRDT3.

In FIG. 11, the NPU bundle 530 and the NIC bundle 570 encode the first streaming data SRDT1 and the third streaming data SRDT3 in pipelined fashion to generate the first encoded streaming data ESRDT1 and the third encoded streaming data ESRDT3.

Figure 12:
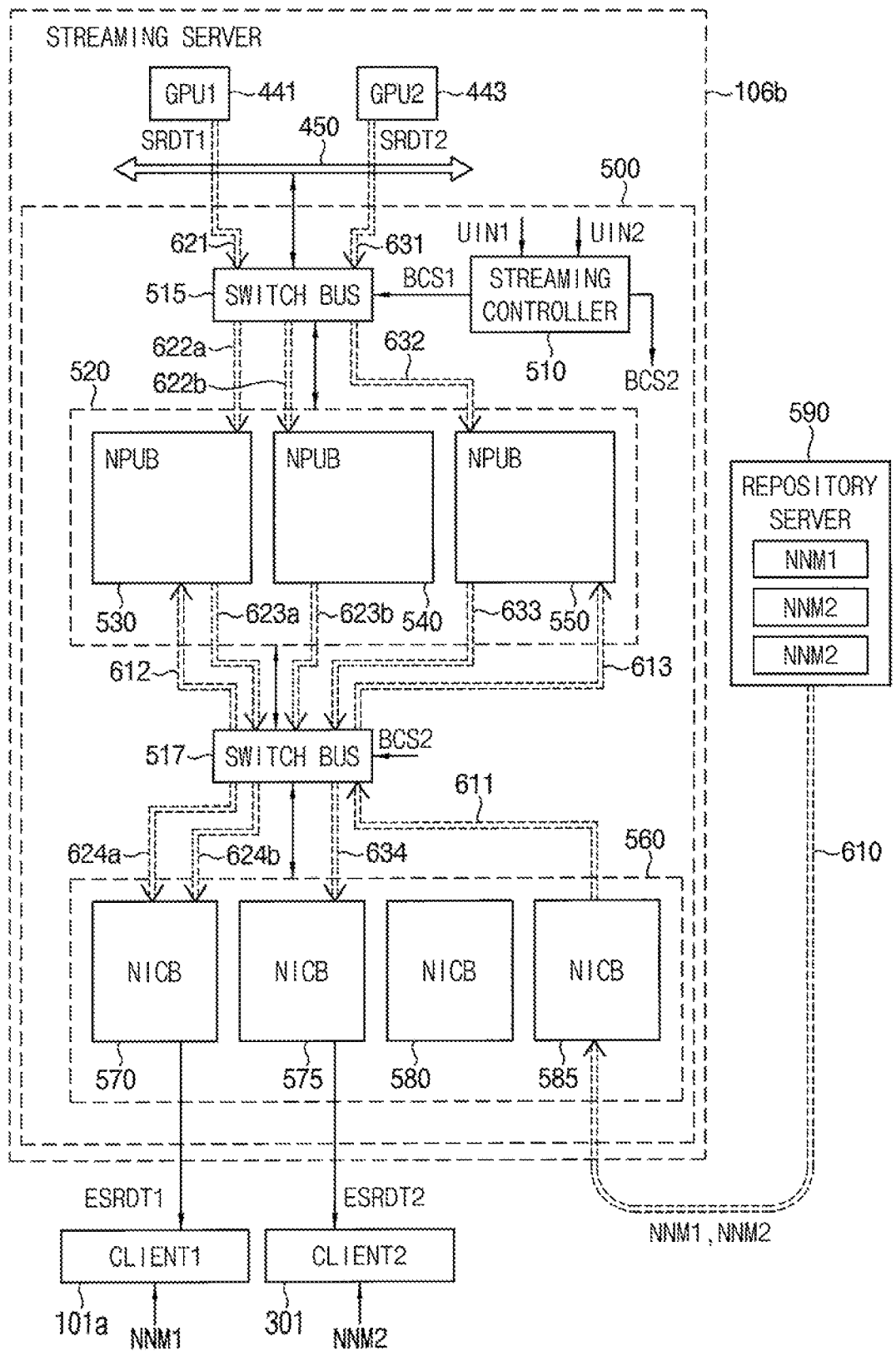
FIG. 12 illustrates an example operation of the streaming accelerator in FIG. 7A according to example embodiments.

FIG. 12 illustrates an example operation of the streaming accelerator 500 in FIG. 7A according to example embodiments. Description repeated with respect to FIG. 9 will be omitted.

Referring to FIG. 12, operation in FIG. 12 differs from the operation of FIG. 9 in that the first GPU 441 provides the first streaming data SRDT1 to the first switch bus 515 through the path 621, the first switch bus 515 provides the first streaming data SRDT1 to the NPU bundle 530 and the NPU bundle 540 through paths 622a and 622b, respectively, the NPU bundle 530 and the NPU bundle 540 process a respective portion of the first streaming data SRDT1 to provide results of the processing to the second switch bus 517 through paths 623a and 623b, respectively, and the second switch bus 517 provides outputs of the NPU bundle 530 and the NPU bundle 540 to the NIC bundle 570 through paths 624a and 624b, respectively.

In FIG. 12, the NPU bundles 530 and 540 and the NIC bundle 570 encode the first streaming data SRDT1 in pipelined fashion to generate the first encoded streaming data ESRDT1. Although not illustrated, the NPU bundles 530 and 540 and the NIC bundles 570 and 575 may encode the first streaming data SRDT1 in pipelined fashion to generate the first encoded streaming data ESRDT1.

Figure 13:
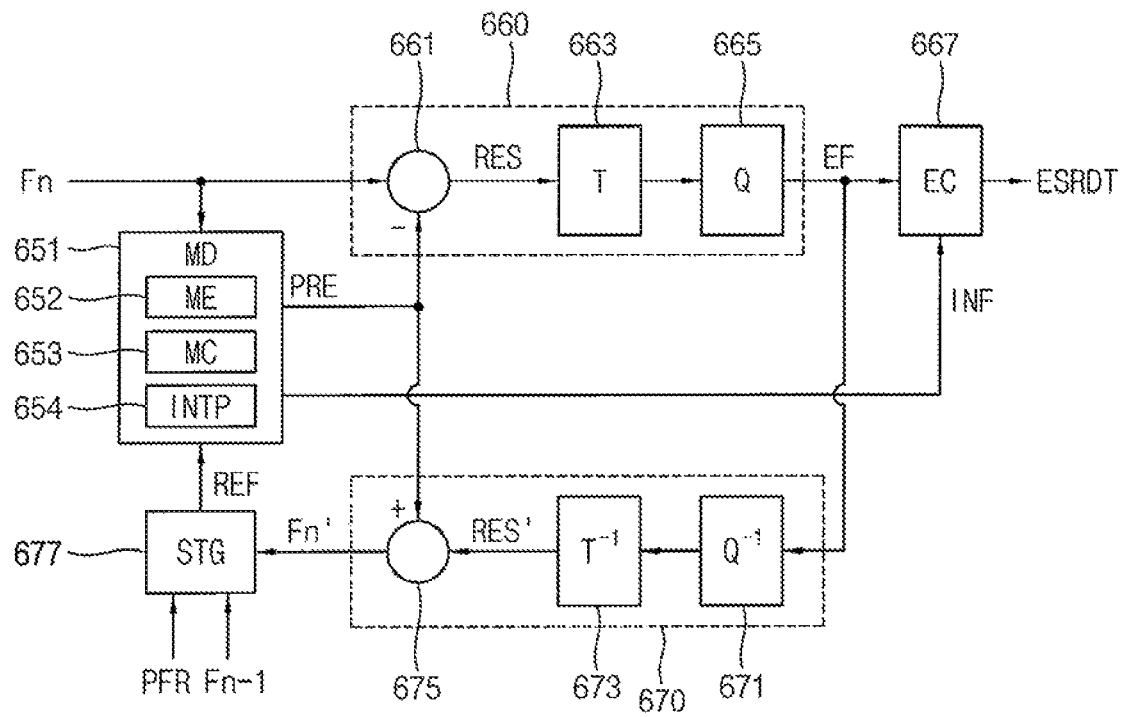
FIG. 13 is a block diagram illustrating an example of the encoder in the streaming accelerator in FIG. 7A according to example embodiments.

FIG. 13 is a block diagram illustrating an example of an encoder in the streaming accelerator 500 in FIG. 7A according to example embodiments.

In FIG. 13, an example of the first encoder 572 in the first NIC bundle 570 in FIG. 7A is described for convenience. It is assumed that the first encoder 572 performs an encoding based on the frame prediction model FPM.

Referring to FIG. 13, the first encoder 572 may include a mode decision block (MD) 651, a compression block 660, an entropy encoder (EC) 667, a reconstruction block 670, and a storage block (STG) 677.

The mode decision block 651 may generate a first predicted frame PRE based on a current frame Fn and a reference frame REF, and may generate coding information INF that includes a prediction mode depending on a prediction operation, a result of the prediction operation, syntax elements, context values, etc. The mode decision block 651 may include a motion estimation unit (ME) 652, a motion compensation unit (MC) 653, and an intra-prediction unit (INTP) 654. The intra prediction unit 654 may perform an intra prediction. The motion estimation unit 652 and the motion compensation unit 653 may be referred to as an inter-prediction unit that performs an inter prediction.

The compression block 660 may encode the current frame Fn to generate an encoded frame EF. The compression block 660 may include a subtractor 661, a transform unit (T) 663, and a quantization unit (Q) 665. The subtractor 661 may subtract the first predicted frame PRE from the current frame Fn to generate a residual frame RES. The transform unit 663 and the quantization unit 665 may transform and quantize the residual frame RES to generate the encoded frame EF.

The encoded frame EF may be provided from the compression block 660 to the reconstruction block 670 as well as the entropy encoder 667.

Receiving the encoded frame EF from the compression block, the reconstruction block 670 (or recovery block) may be used to generate a reconstructed frame Fn' by decoding the encoded frame EF. The reconstruction block 670 may include an inverse quantization unit ($Q^{-1}$) 671, an inverse transform unit ($T^{-1}$) 673, and an adder 675. The inverse quantization unit 671 and the inverse transform unit 673 may inverse-quantize and inverse-transform the encoded frame EF to generate a reconstructed residual frame RES'. The adder 675 may add the reconstructed residual frame RES' to the first predicted frame PRE to generate the reconstructed frame Fn'.

Also receiving the encoded frame EF from the compression block, the entropy encoder 667 may perform a lossless encoding with respect to the encoded frame EF and the coding information INF to generate the encoded streaming data ESRDT.

The reconstructed frame Fn' from the reconstruction block 670 may be stored into the storage 677, and may be used as another reference frame REF for encoding the other frames. The storage 677 may also store a previous frame Fn−1. The storage 677 may also store the predicted frame PFR output from the frame prediction model FPM.

The motion estimation unit 652 may perform a motion estimation by referring to a higher-similarity frame selected from the previous frame Fn−1 and the predicted frame PFR, the selected frame being the one having a higher similarity with the subject (present) frame Fn. Thus, the first encoder 572 may encode the subject frame Fn by using the higher-similarity frame selected from the previous frame Fn−1 and the predicted frame PFR, to provide the encoded streaming data ESRDT to the client device 101.

Figure 14:
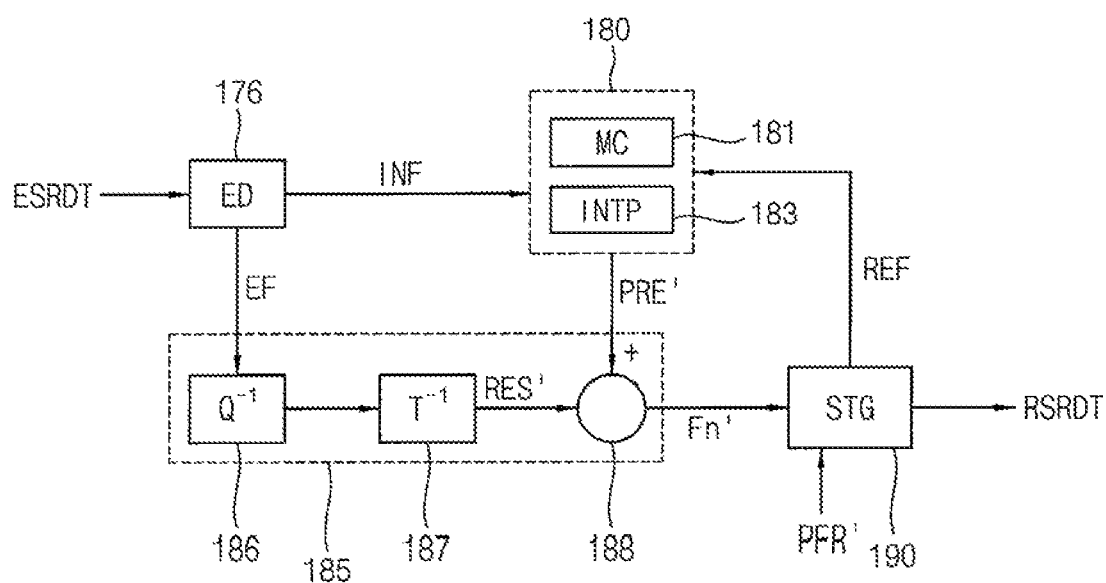
FIG. 14 is a block diagram illustrating an example of the decoder in the client device of FIG. 4 according to example embodiments.

FIG. 14 is a block diagram illustrating an example of a decoder in the client device 101 of FIG. 4 according to example embodiments.

Referring to FIG. 14, the decoder 125 may include an entropy decoder (ED) 176, a prediction block 180, a reconstruction block 185, and a storage 190.

The decoder 125 may generate a recovered streaming data by reversely decoding the encoded streaming data ESRDT that is encoded by the first encoder 572.

The entropy decoder 176 may decode the encoded streaming data ESRDT to generate the encoded frame EF and the coding information INF.

The prediction block 180 may generate a second predicted frame PRE' based on the reference frame REF and the coding information INF. The prediction block 180 may include a motion compensation unit 181 and an intra prediction unit 183 that are substantially the same as the motion compensation unit 653 and the intra prediction unit 654 in FIG. 13, respectively.

The reconstruction block 185 may include an inverse quantization unit 186, an inverse transform unit 187, and an adder 188. The reconstruction block 185 may be substantially the same as the reconstruction block 670 in FIG. 13.

The reconstructed frame Fn' from the reconstruction block 185 may be stored in the storage 190, and may be used as another reference frame or may be provided to the display 160 as the encoded streaming data ESRDT. The storage 190 may be substantially the same as the storage 677 in FIG. 13.

The storage 190 may store a predicted frame PFR' provided from the frame prediction model FPM. The storage 190 may also store a previous frame Fn−1 and the first predicted frame PRE.

The prediction block 180 may generate the second predicted frame PRE' by using a higher-similarity frame selected from a previous frame of the reconstructed frame Fn' and the predicted frame PFR', which has a higher similarity with the reconstructed frame Fn' as the reference frame REF.

Figure 15:
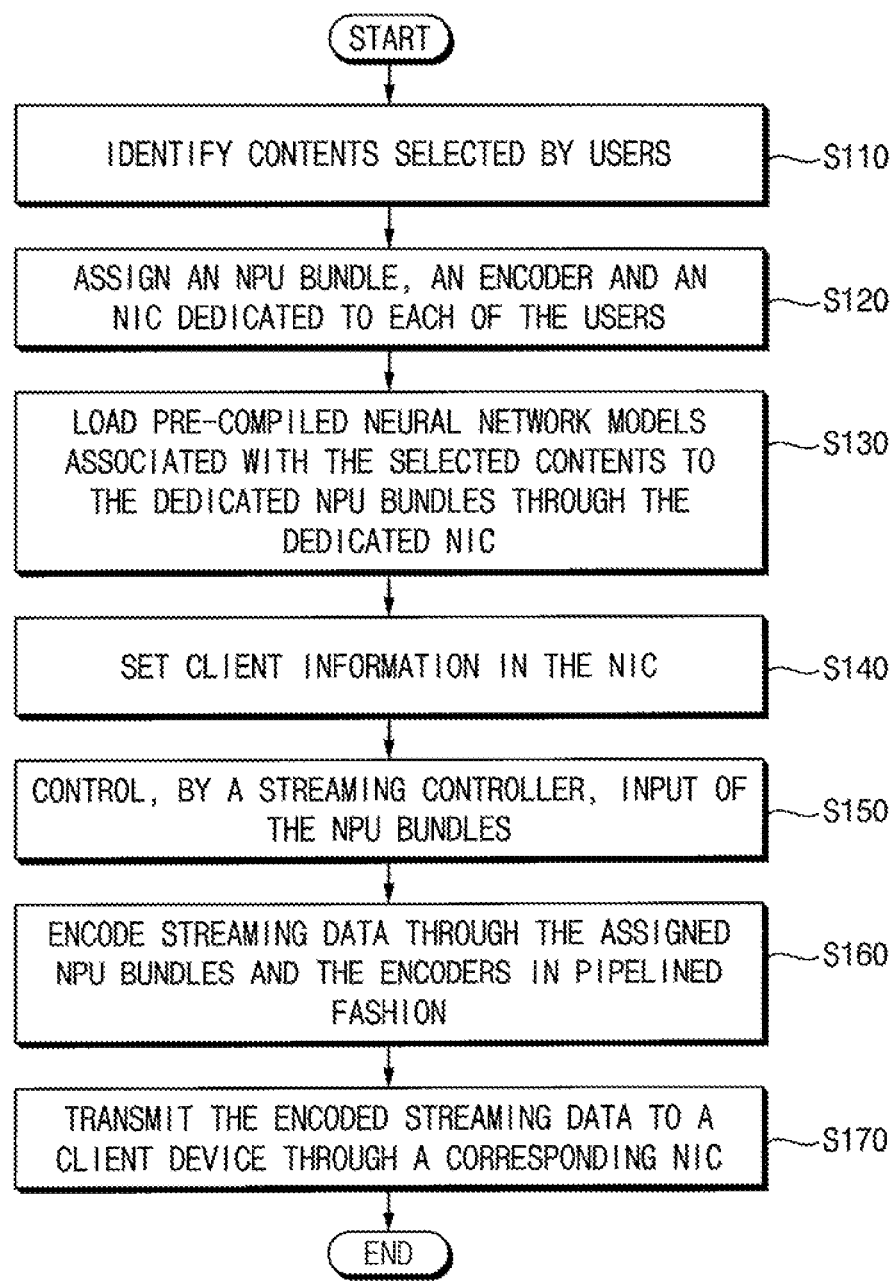
FIG. 15 is a flow chart illustrating a method of operating a streaming accelerator in FIG. 7A according to example embodiments.

FIG. 15 is a flow chart illustrating a method of operating a streaming accelerator in FIG. 7A according to example embodiments.

Referring to FIGS. 7A through 15, in a method of operating the streaming accelerator 500, the streaming controller 510 may identify contents selected by the first user USER #1 and the second USER #2 based on the first user input UIN1 and the second user input UIN2 (operation S110). The contents may be a streaming game or a map in the game.

The scheduler 513 in the streaming controller 510 may assign an NPU bundle, an encoder, and a NIC (an NIC bundle) to respective one of the users USER #1 and USER #2 based on the user inputs UIN1 and UIN2 (operation S120).

The repository server 590 may load neural network models (which are pre-compiled and stored therein) to assigned NPU bundles through the dedicated NIC 588 based on the user inputs UIN1 and UIN2 (operation S130).

The scheduler 513 may set client information corresponding to the users USER #1 and USER #2 in NICs in the NIC bundles (operation S140).

The streaming controller 510 may control input to the NPU bundles 530, 540, and 550 by controlling the first switch bus 515 using the first bus control signal BCS1 (operation S150).

The first streaming data SRDT1 and the second streaming data SRDT2 may be encoded by the first selected NPU bundle and the second selected NPU bundle (determined from among the NPU bundles 530, 540, and 550) and by the first selected NIC bundle and the second selected NIC bundle (determined from among the NIC bundles 570, 575, 580, and 585) (operation S160).

The encoded first streaming data ESRDT1 and the second encoded streaming data ESRDT2 may be transmitted to the first client device 101a and the second client device 301, respectively, through NICs in the first selected NIC bundle and the second selected NIC bundle (operation S170).

FIG. 16 illustrates an example embodiment of the scheduler in FIG. 7A assigning the NPU bundles and the NIC bundles to the users.

Referring to FIG. 16, for the first user USER #1 and the second user USER #2, the scheduler 513 may assign identifiers ID_00 and ID_02 to the first selected NPU bundle and may assign identifiers ID_10 and ID_11 the second selected NPU bundle, determined from among the NPU bundles 530, 540, and 550. The scheduler 513 may assign identifiers ID_00 and ID_02 to the first selected NIC bundle and the second selected NIC bundle, determined from among the NIC bundles 570, 575, 580, and 585. The scheduler 513 may assign a same identifier ID_33 to a dedicated NIC, which is used for loading the neural network models.

According to example embodiments, the streaming accelerator may process the first streaming data and the second streaming data separately in at least two NPU bundles of a plurality of NPU bundles by using a first switch bus, and may encode outputs of the at least two NPU bundles in at least two NIC bundles of a plurality of NIC bundles by using a second switch bus to generate a first encoded streaming data and the second encoded streaming data in pipelined fashion. Therefore, the streaming accelerator may enhance speed of processing the streaming data. In addition, since the first switch bus separates GPUs from the NPU bundles and the second switch bus separates the NPU bundles from the NIC bundles, the streaming accelerator may prevent a current processing from being influenced by a previous processing.

Figure 17:
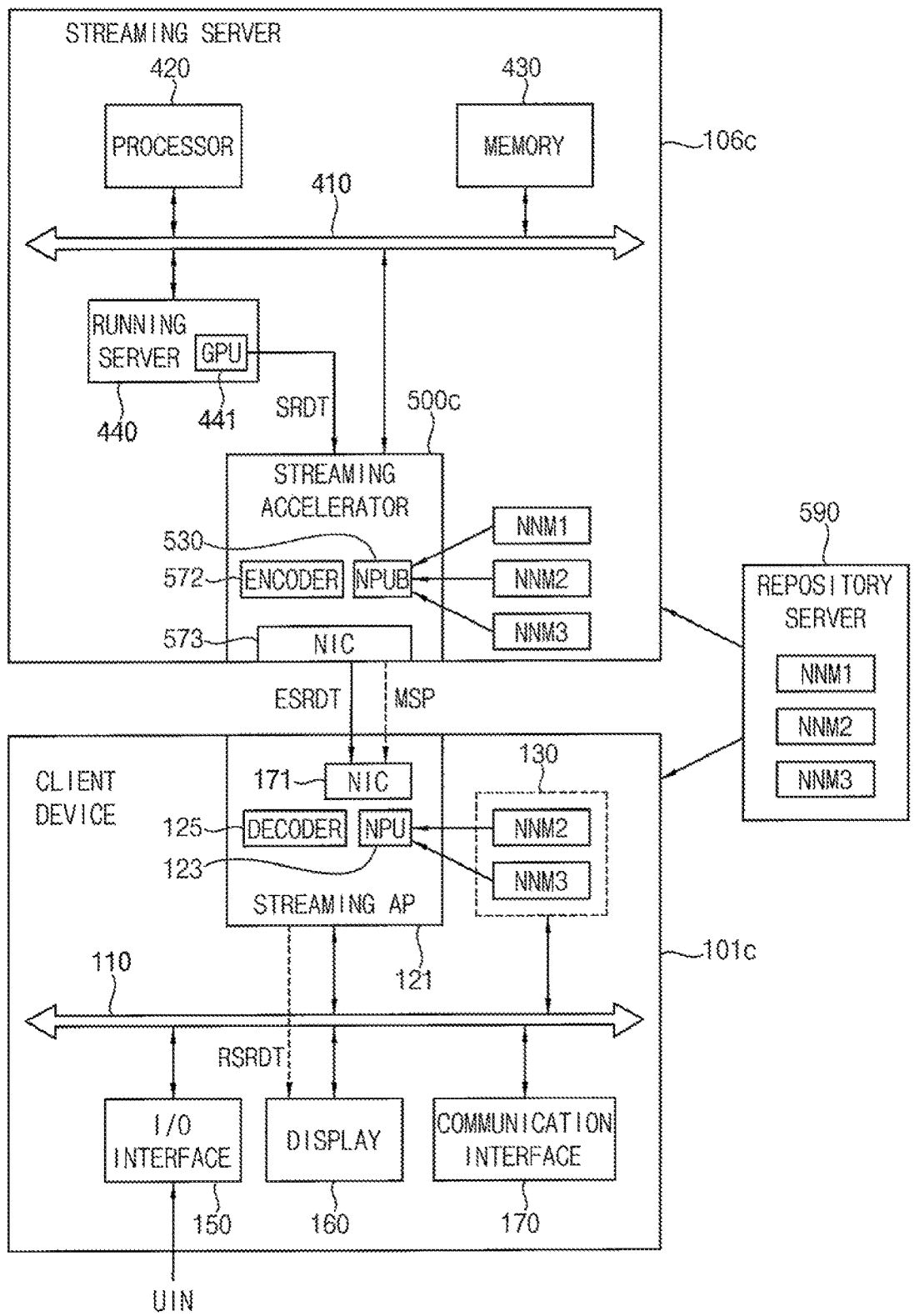
FIG. 17 illustrates a streaming system according to example embodiments.

FIG. 17 illustrates a streaming system according to example embodiments.

Referring to FIG. 17, a streaming system 100c may include a streaming server 106c and a client device 101c. In some example embodiments, the streaming system 100c may further include a repository server 590.

The streaming server 106c may include a processor 420, a memory 430, a running server 440, and a streaming accelerator 500c. The processor 420, the memory 430, the running server 440, and the streaming accelerator 500c may be operatively coupled to each other through a bus 410.

The running server 440 may include a first GPU 441. Each operation of the processor 420, the memory 430, and the running server 440 may be substantially the same as the descriptions with reference to FIG. 3.

The streaming accelerator 500c may include a first encoder 572, an NPU bundle 530, and a first NIC 573.

The NPU bundle 530 may apply the streaming data SRDT to at least a portion of the neural network models NNM1, NNM2, and NNM3 to generate an intermediate streaming data. The first encoder 572 may encode the intermediate streaming data to generate the encoded streaming data ESRDT, and may provide the encoded streaming data ESRDT to the client device 101c through the first NIC 573.

The NPU bundle 530 may transmit information on the neural network models NNM1, NNM2, and NNM3 to the client device 101c as a model synchronization protocol MSP through the first NIC 573.

The client device 101c may include a streaming application processor (AP) 121, a memory 130, an I/O interface 150, a display 160, and a communication interface 170. The streaming application processor 121, the memory 130, the I/O interface 150, the display 160, and the communication interface 170 may be coupled to each other through a bus 110. The streaming application processor 121 may be referred to as an application processor.

Operations of each of the memory 130, the I/O interface 150, and the display 160 may be substantially the same as the descriptions with reference to FIG. 4.

The streaming application processor 121 may include a NIC 171, a decoder 125, and an NPU 123. The NIC 171 may receive the encoded streaming data ESRDT and the model synchronization protocol MSP from the streaming server 106c. The memory 130 may store the neural network models NNM2 and NNM3, and may provide the neural network models NNM2 and NNM3 to the NPU 123. The NPU 123 may decode the encoded streaming data ESRDT by applying the encoded streaming data ESRDT to at least a portion of the neural network models NNM2 and NNM3 to generate a recovered streaming data RSRDT, and may provide the recovered streaming data RSRDT to the display 160.

The decoder 125 may decode the encoded streaming data ESRDT by selectively referring to the predicted frame to generate a recovered streaming data ESRDT, and may provide the recovered streaming data ESRDT to the user through the display 160.

In FIG. 17, each of the streaming accelerator 500c and the streaming application processor 121 may be implemented with hardware such as a logic circuit, processing circuitry, etc. The streaming accelerator 500c may be installed the streaming server 106c. The streaming application processor 121 may be mounted on the client device 101c.

In some example embodiments, when the streaming accelerator 500c is installed in a personal computer, the personal computer may operate as the streaming server.

The repository server 590 may store a plurality of neural network models NNM1, NNM2, and NNM3, or may store pre-compiled versions of the neural network models NNM1, NNM2, and NNM3, and may provide at least a portion of the neural network models NNM1 and NNM2 to the streaming server 106c and the client device 101c.

Figure 18:
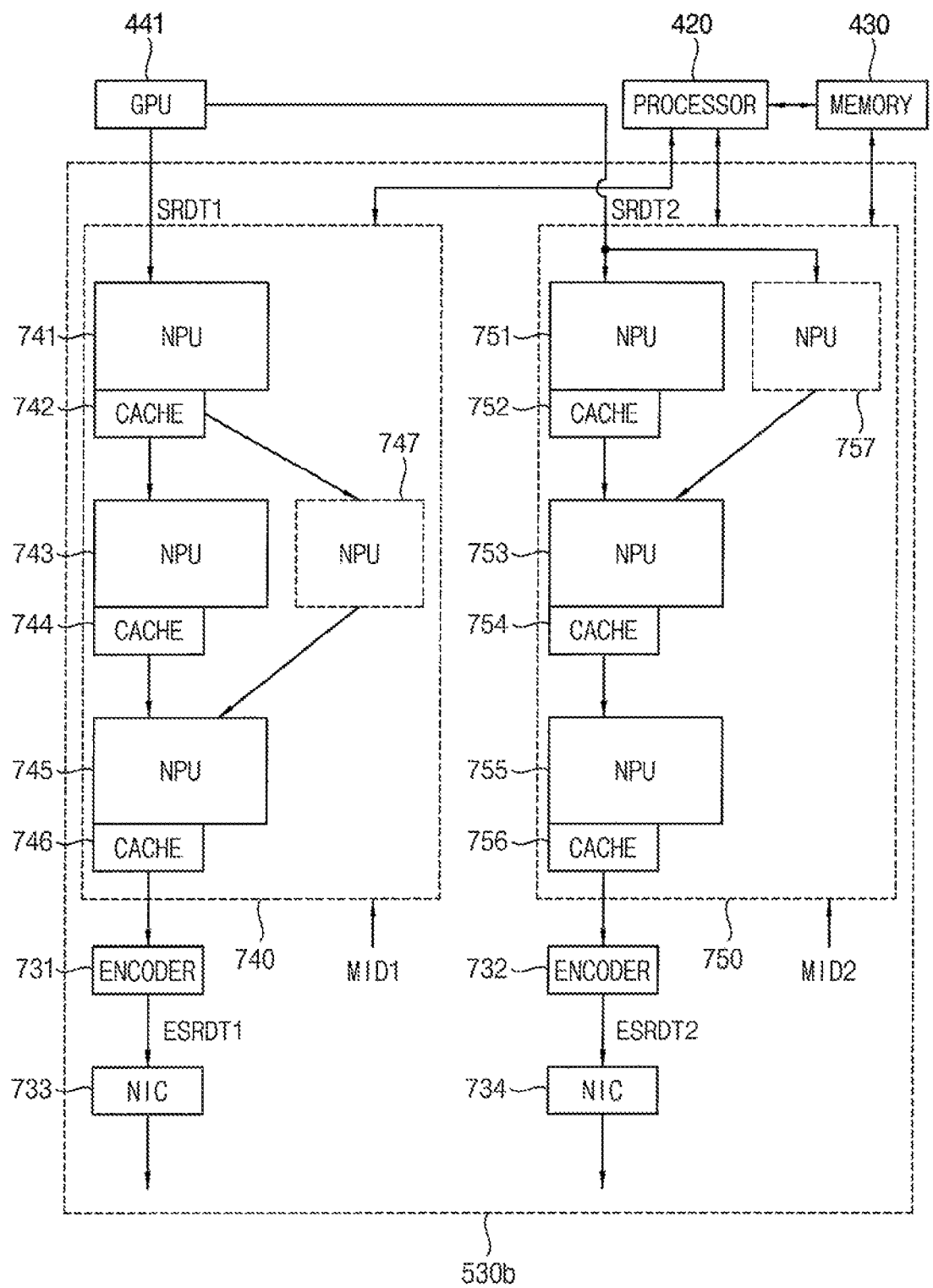
FIG. 18 is a block diagram illustrating an example of the NPU bundle in FIG. 17 according to example embodiments.

FIG. 18 is a block diagram illustrating an example of the NPU bundle in FIG. 17 according to example embodiments. In FIG. 18, the first GPU 441, the processor 420, and the memory 430 are also illustrated for convenience of explanation.

Referring to FIG. 18, an NPU bundle 530b may include a first processing cluster 740, a second processing cluster 750, a first encoder 731, a second encoder 732, a first communication interface 733, and a second communication interface 734. Each of the first communication interface 733 and the second communication interface 734 may be implemented with a NIC.

The first GPU 441 may generate a first streaming data SRDT1 (associated with a first user) and a second streaming data SRDT2 (associated with a second user different from the first user), and may provide the first streaming data SRDT1 and the second streaming data SRDT2 to the first processing cluster 740 and the second processing cluster 750, respectively.

The first processing cluster 740 may generate a first intermediate streaming data by applying the first streaming data SRDT1 to at least a portion of a plurality of neural network models, and may provide the first intermediate streaming data to the first encoder 731.

The first processing cluster 740 may include a plurality of NPUs 741, 743, and 745 with a pipelined configuration, a plurality of caches 742, 744, and 746 (respectively connected to the NPUs 741, 743, and 745), and a reserved NPU 747. The NPUs 741, 743, and 745 may implement different inference models using different neural networks, respectively. The reserved NPU 747 may employ a neural network model which will be used later. Each of the caches 742, 744, and 746 may store frequently-used data in respective one of the NPUs 741, 743, and 745, and may enhance performance.

The second processing cluster 750 may generate a second intermediate streaming data by applying the second streaming data SRDT2 to at least a portion of a plurality of neural network models, and may provide the second intermediate streaming data to the second encoder 732. The second processing cluster 750 may include a plurality of NPUs 751, 753, and 755 with a pipelined configuration, a plurality of caches 752, 754, and 756 (respectively connected to the NPUs 751, 753, and 755), and a reserved NPU 757. The NPUs 751, 753, and 755 may implement different inference models using different neural networks, respectively. The reserved NPU 757 may employ a neural network model which will be used later. Each of the caches 752, 754, and 756 may store frequently-used data in respective one of the NPUs 751, 753, and 755, and may enhance performance.

The first encoder 731 may encode the first intermediate streaming data to generate a first encoded streaming data ESRDT1, and may transmit the first encoded streaming data ESRDT1 to a first client device (which the first user uses) through the first communication interface 733.

The second encoder 732 may encode the second intermediate streaming data to generate a second encoded streaming data ESRDT2, and may transmit the second encoded streaming data ESRDT2 to a second client device (which the second user uses) through the second communication interface 734.

The first processing cluster 740 may receive information MID1 on the first frame prediction model from the repository server 590 in FIG. 17. The second processing cluster 750 may receive information MID2 on the second frame prediction model from the repository server 590 in FIG. 17.

Figure 19:
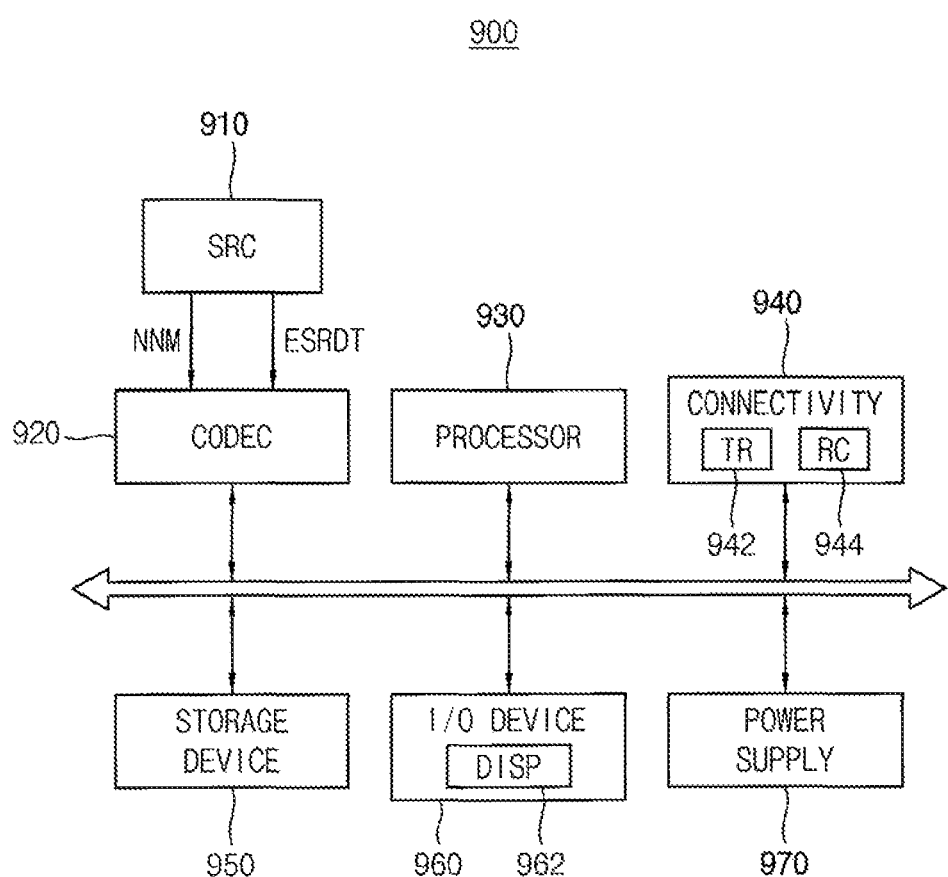
FIG. 19 is a block diagram illustrating an electronic system according to example embodiments.

FIG. 19 is a block diagram illustrating an electronic system according to example embodiments.

Referring to FIG. 19, an electronic system 900 may include a video source 910 and a video codec 920. The electronic system 900 may further include a processor 930, a connectivity module 940, a storage device 950, an I/O device 960, and a power supply 970.

The video source 910 may provide an encoded streaming data ESRDT and a neural network model NNM to the video codec 920. For example, the video source 910 may include a streaming server to provide streaming service. The video source 910 may include a streaming accelerator according to example embodiments. The streaming accelerator may encode a plurality of streaming data in pipelined fashion through independent paths to generate the encoded streaming data ESRDT.

The video codec 920 may include a decoder according to example embodiments.

The processor 930 may perform various computational functions such as particular calculations and tasks. The connectivity module 940 may communicate with an external device, and may include a transmitter 942 and/or a receiver 944. The storage device 950 may operate as data storage for data processed by the electronic system 900, or as a working memory.

The I/O device 960 may include at least one input device such as a keypad, a button, a microphone, a touch screen, etc., and/or at least one output device such as a speaker, a display device 962, etc. The power supply 970 may provide power to the electronic system 900.

Example embodiments may be applied to various streaming servers that provide streaming services. Some example embodiments provide a streaming accelerator capable of processing streaming data in pipelined fashion. Some example embodiments provide a streaming system including a streaming accelerator capable of processing streaming data in pipelined fashion.

Accordingly, the streaming accelerator and the streaming system may process the first streaming data and the second streaming data separately in at least two NPU bundles of a plurality of NPU bundles by using a first switch bus, and may encode outputs of the at least two NPU bundles in at least two NIC bundles of a plurality of NIC bundles by using a second switch bus to generate a first encoded streaming data and the second encoded streaming data in pipelined fashion. Therefore, the streaming accelerator may enhance speed of processing the streaming data. In addition, since the first switch bus separates GPUs from the NPU bundles and the second switch bus separates the NPU bundles from the NIC bundles, the streaming accelerator may prevent a current processing from being influenced by a previous processing.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A streaming accelerator, comprising:
a first pool including a plurality of neural processing unit (NPU) bundles, each of the plurality of NPU bundles including a plurality of NPUs;
a first switch bus, the first switch bus being configured to, in response to a first bus control signal, provide a first streaming data and a second streaming data to a first selected NPU bundle and a second selected NPU bundle from among the plurality of NPU bundles, respectively, the first streaming data corresponding to a first user and the second streaming data corresponding to a second user;
a second pool including a plurality of network interface card (NIC) bundles, each of the plurality of NIC bundles including an encoder and a NIC; and
a second switch bus, connected between the first pool and the second pool, the second switch bus being configured to, in response to a second bus control signal, provide a first intermediate streaming data from the first selected NPU bundle and a second intermediate streaming data from the second selected NPU bundle to a first selected NIC bundle and a second selected NIC bundle from among the plurality of NIC bundles, respectively,
wherein the first selected NIC bundle is configured to encode the first intermediate streaming data to generate a first encoded streaming data, and configured to provide the first encoded streaming data to a first client device associated with the first user, and
wherein the second selected NIC bundle is configured to encode the second intermediate streaming data to generate a second encoded streaming data, and configured to provide the second encoded streaming data to a second client device associated with the second user.

2. The streaming accelerator as claimed in claim 1, wherein:
the first selected NPU bundle is configured to apply the first streaming data to at least a portion of a plurality of first neural network models to generate the first intermediate streaming data; and
the second selected NPU bundle is configured to, independently from the first selected NPU bundle, apply the second streaming data to at least a portion of a plurality of second neural network models to generate the second intermediate streaming data.

3. The streaming accelerator as claimed in claim 1, wherein:
the first selected NPU bundle and the first selected NIC bundle are configured to provide a first path via which the first streaming data passes by;
the second selected NPU bundle and the second selected NIC bundle are configured to provide a second path via which the second streaming data passes by; and
the first path and the second path are independent from each other.

4. The streaming accelerator as claimed in claim 1, wherein:
the first switch bus is connected to a first graphic processing unit (GPU) and a second GPU through a system bus;

the first GPU is configured to generate the first streaming data; and the second GPU is configured to generate the second streaming data.

5. The streaming accelerator as claimed in claim 1, further comprising:
a streaming controller configured to generate the first bus control signal and the second bus control signal based on a first user input from the first user and a second user input from the second user,
wherein the streaming controller is configured to determine the first selected NPU bundle and the second selected NPU bundle based on the first user input and the second user input, and is configured to determine the first selected NIC bundle and the second selected NIC bundle based on the first user input and the second user input.

6. The streaming accelerator as claimed in claim 5, wherein the plurality of NPU bundles include:
a first NPU bundle including first NPUs and a first memory connected to a first internal bus;
a second NPU bundle including second NPUs and a second memory connected to a second internal bus; and
a third NPU bundle including third NPUs and a third memory connected to a third internal bus,
wherein the first switch bus is configured to provide the first streaming data to the first NPU bundle and configured to provide the second streaming data to the second NPU bundle, in response to the first bus control signal.

7. The streaming accelerator as claimed in claim 6, wherein:
the first NPUs are configured to implement first different neural network models based on first different neural networks;
the second NPUs are configured to implement second different neural network models based on second different neural networks; and
the third NPUs are configured to implement third different neural network models based on third different neural networks.

8. The streaming accelerator as claimed in claim 5, wherein the plurality of NIC bundles include at least:
a first NIC bundle including a first encoder and a first NIC connected to a first internal bus;
a second NIC bundle including a second encoder and a second NIC connected to a second internal bus; and
a third NIC bundle including a third encoder and a third NIC connected to a third internal bus,
wherein the second switch bus is configured to provide the first intermediate streaming data to the first NIC bundle and configured to provide the second intermediate streaming data to the second NIC bundle, in response to the second bus control signal.

9. The streaming accelerator as claimed in claim 8, wherein:
at least two of the first encoder, the second encoder, and the third encoder are different kinds, and
at least two of the first NIC, the second NIC, and the third NIC have different performance.

10. The streaming accelerator as claimed in claim 8, wherein:
the third NIC bundle is configured to provide first neural network models and second neural network models to a first memory in the first selected NPU bundle and a second memory in the first selected NPU bundle, respectively, and the first neural network models and the second neural network models are provided from an external repository server and are pre-compiled.

11. The streaming accelerator as claimed in claim 10, wherein the third NIC bundle is dedicated to the external repository server.

12. The streaming accelerator as claimed in claim 10, wherein the third NIC bundle is undedicated to the external repository server.

13. The streaming accelerator as claimed in claim 1, wherein:
the first switch bus is configured to provide the first streaming data to two NPU bundles from among the plurality of NPU bundles in response to the first bus control signal; and
the second switch bus is configured to provide the first intermediate streaming data to two NIC bundles from among the plurality of NIC bundles in response to the second bus control signal.

14. The streaming accelerator as claimed in claim 1, wherein:
the first switch bus is configured to provide a third streaming data to the first selected NPU bundle in response to the first bus control signal; and
the first selected NPU bundle is configured to process the first streaming data and the third streaming data together, and configured to provide the second switch bus with the first intermediate streaming data and a third intermediate data corresponding to the third streaming data.

15. The streaming accelerator as claimed in claim 14, wherein:
the second switch bus is configured to provide the first intermediate streaming data and the third intermediate streaming data to the first selected NIC bundle in response to the second bus control signal; and
the first selected NIC bundle is configured to encode the first intermediate streaming data and the third intermediate streaming data in pipelined fashion to output the first encoded streaming data and a third encoded streaming data corresponding to the third streaming data.

16. A streaming system, comprising:
a streaming server configured to:
encode a first streaming data and a second streaming data in pipelined fashion by applying the first streaming data and the second streaming data to different neural network models among a plurality of neural network models through separate paths, and
transmit a first encoded streaming data and a second encoded streaming data;
a first client device configured to:
receive a first neural network model associated with the first streaming data from among the neural network models, and receive the first encoded streaming data, and
decode the first encoded streaming data based on the first neural network model to provide a first recovered streaming data to a first user; and
a second client device configured to:
receive a second neural network model associated with the second streaming data from among the neural network models, and receive the second encoded streaming data, and
decode the second encoded streaming data based on the second neural network model to provide a second recovered streaming data to a second user.

17. The streaming system as claimed in claim 16, wherein:
- the streaming server includes:
  - a processor;
  - a memory, coupled to the processor, the memory being configured to store instructions; and
  - a running server, coupled to the processor, the running server including a first graphic processing unit (GPU) configured to generate the first streaming data, a second GPU configured to generate the second streaming data, and a streaming accelerator,
- the streaming accelerator includes:
  - a first pool including a plurality of neural processing unit (NPU) bundles, each of the plurality of NPU bundles including a plurality of NPUs;
  - a first switch bus configured to, in response to a first bus control signal, provide the first streaming data and the second streaming data to a first selected NPU bundle and a second selected NPU bundle from among the plurality of NPU bundles, respectively;
  - a second pool including a plurality of network interface card (NIC) bundles, each of the NIC bundles including an encoder and a NIC; and
  - a second switch bus, connected between the first pool and the second pool, the second switch bus being configured to, in response to a second bus control signal, provide a first intermediate streaming data from the first selected NPU bundle and a second intermediate streaming data from the second selected NPU bundle to a first selected NIC bundle and a second selected NIC bundle from among the plurality of NIC bundles, respectively,
- the first selected NIC bundle is configured to encode the first intermediate streaming data to generate a first encoded streaming data, and configured to provide the first encoded streaming data to the first client device, and
- the second selected NIC bundle is configured to encode the second intermediate streaming data to generate a second encoded streaming data, and configured to provide the second encoded streaming data to the second client device.

18. The streaming system as claimed in claim 16, wherein each of the first client device and the second client device is configured to support at least one of a virtual reality and an augmented reality.

19. The streaming system as claimed in claim 16, further comprising:
- a repository server configured to pre-compile the plurality of neural network models, and configured to provide the pre-compiled neural network models to the streaming server, the first client device, and the second client device.

20. A streaming accelerator, comprising:
- a pool including a plurality of neural processing unit (NPU) bundles and a plurality of network interface card (NIC) bundles corresponding to the plurality of NPU bundles, each of the plurality of NPU bundles including a plurality of NPUs, each of the NIC bundles including an encoder and a NIC; and
- a switch bus configured to, in response to a bus control signal, provide a first streaming data and a second streaming data to a first selected NPU bundle and a second selected NPU bundle from among the plurality of NPU bundles, respectively, the first streaming data corresponding to a first user and the second streaming data corresponding to a second user;

wherein:
- a first NIC bundle, connected to the first selected NPU bundle, from among the plurality of NPU bundles, is configured to receive a first intermediate streaming data from the first selected NPU bundle,
- a second NIC bundle, connected to the second selected NPU bundle, from among the plurality of NPU bundles, is configured to receive a second intermediate streaming data from the second selected NPU bundle,
- the first NIC bundle is configured to generate a first encoded streaming data by encoding the first intermediate streaming data to provide the first encoded streaming data to a first client device associated with the first user, and
- the second NIC bundle is configured to generate a second encoded streaming data by encoding the second intermediate streaming data to provide the second encoded streaming data to a second client device associated with the second user.

* * * * *